(12) United States Patent  
Terada et al.

(10) Patent No.: US 7,110,172 B2
(45) Date of Patent: Sep. 19, 2006

(54) MICROSCOPE AND SAMPLE OBSERVATION METHOD

(75) Inventors: Hirotoshi Terada, Hamamatsu (JP); Ikuo Arata, Hamamatsu (JP); Masaharu Tokiwa, Hamamatsu (JP); Hiroshi Tanabe, Hamamatsu (JP); Shigeru Sakamoto, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 63 days.

(21) Appl. No.: 10/880,100

(22) Filed: Jun. 30, 2004

(65) Prior Publication Data

US 2005/0190436 A1    Sep. 1, 2005

(30) Foreign Application Priority Data

Feb. 27, 2004  (JP) .............................. 2004-053343

(51) Int. Cl.
   *G02B 21/00*   (2006.01)
(52) U.S. Cl. .................. 359/381; 359/368; 359/900
(58) Field of Classification Search ............... 359/381
   See application file for complete search history.

(56) References Cited

U.S. PATENT DOCUMENTS

| 5,004,307 | A | | 4/1991 | Kino et al. ................... 350/1.2 |
| 5,121,256 | A | * | 6/1992 | Corle et al. ................... 359/664 |
| 5,125,750 | A | | 6/1992 | Corle et al. ................... 359/819 |
| 5,208,648 | A | | 5/1993 | Batchelder et al. ......... 356/237 |
| 5,220,403 | A | | 6/1993 | Batchelder et al. ......... 356/345 |
| 5,422,498 | A | | 6/1995 | Nikawa et al. ............... 257/48 |
| 5,939,709 | A | | 8/1999 | Ghislain et al. ............. 250/216 |
| 5,940,545 | A | | 8/1999 | Kash et al. ................... 382/312 |
| 6,002,792 | A | | 12/1999 | Oguri et al. ................. 382/145 |
| 6,226,238 | B1 | | 5/2001 | Kasono ..................... 369/44.23 |
| 6,441,359 | B1 | | 8/2002 | Cozier et al. ............... 250/216 |
| 6,475,398 | B1 | | 11/2002 | Kitahata ......................... 216/2 |

(Continued)

FOREIGN PATENT DOCUMENTS

EP       0 977 192 A1      2/2000

(Continued)

OTHER PUBLICATIONS

ISTFA 2003 "Photoemission and OBIRCH Analysis With Solid Immersion Lens (SIL)", ISTFA 2003, pp. 1-20.

(Continued)

*Primary Examiner*—Drew A. Dunn
*Assistant Examiner*—Scott Stephens
(74) *Attorney, Agent, or Firm*—Drinker Biddle & Reath LLP

(57) ABSTRACT

For a semiconductor device S as an inspected object, there are provided an image acquisition part 1, an optical system 2 including an objective lens 20, and a solid immersion lens (SIL) 3 movable between an insertion position including an optical axis from the semiconductor device S to the objective lens 20 and a standby position off the optical axis. Then observation is carried out in two control modes consisting of a first mode in which the SIL 3 is located at the standby position and in which focusing and aberration correction are carried out based on a refractive index no and a thickness to of a substrate of the semiconductor device S, and a second mode in which the SIL 3 is located at the insertion position and in which focusing and aberration correction are carried out based on the refractive index no and thickness $t_0$ of the substrate, and a refractive index $n_1$, a thickness $d_1$, and a radius of curvature $R_1$ of SIL 3. This provides a microscope and a sample observation method capable of readily performing observation of the sample necessary for an analysis of microstructure or the like of the semiconductor device.

11 Claims, 20 Drawing Sheets

U.S. PATENT DOCUMENTS

| | | | |
|---|---|---|---|
| 6,594,086 B1 | 7/2003 | Pakdaman et al. | 359/656 |
| 6,600,714 B1 * | 7/2003 | Ichimura et al. | 369/275.1 |
| 6,608,359 B1 | 8/2003 | Kitahata | 257/432 |
| 6,621,275 B1 * | 9/2003 | Cotton et al. | 324/537 |
| 6,656,029 B1 | 12/2003 | Kitahata | 451/384 |
| 6,687,058 B1 | 2/2004 | Ippolito et al. | 359/656 |
| 6,778,327 B1 | 8/2004 | Pakdaman et al. | 359/656 |
| 6,828,811 B1 | 12/2004 | Hanson et al. | 324/754 |
| 6,961,672 B1 | 11/2005 | Kasapi | 702/182 |
| 2001/0021145 A1 | 9/2001 | Ichimura et al. | 369/43 |
| 2003/0202255 A1 | 10/2003 | Pakdaman et al. | 359/656 |
| 2003/0210057 A1 | 11/2003 | Cotton et al. | 324/501 |
| 2004/0240051 A1 * | 12/2004 | Terada et al. | 359/383 |
| 2004/0240074 A1 | 12/2004 | Pakdaman et al. | 359/656 |
| 2005/0002028 A1 | 1/2005 | Kasapi et al. | 356/328 |
| 2005/0030051 A1 | 2/2005 | Hanson et al. | 324/754 |
| 2005/0063046 A1 * | 3/2005 | Arata et al. | 359/368 |
| 2005/0094258 A1 | 5/2005 | Tanabe et al. | 359/368 |
| 2005/0094293 A1 * | 5/2005 | Tanabe et al. | 359/811 |
| 2005/0190436 A1 | 9/2005 | Terada et al. | 359/381 |
| 2005/0220266 A1 | 10/2005 | Hirsch | 378/43 |

FOREIGN PATENT DOCUMENTS

| | | |
|---|---|---|
| JP | 05-80247 | 4/1993 |
| JP | 05-157701 | 6/1993 |
| JP | 06-300824 | 10/1994 |
| JP | 7-18806 | 3/1995 |
| JP | 07-190946 | 7/1995 |
| JP | 10-150086 | 6/1998 |
| JP | 11-003534 | 1/1999 |
| JP | 2002-121930 | 4/2000 |
| JP | 2000-171611 | 6/2000 |
| JP | 2001-023230 | 1/2001 |
| JP | 2001-034998 | 2/2001 |
| JP | 2002-189000 | 7/2002 |
| JP | 2002-236087 | 8/2002 |
| JP | 2003-502705 | 1/2003 |
| JP | 2003-181672 | 7/2003 |
| WO | WO 2004/083930 | 9/2004 |
| WO | WO2005/043210 | 5/2005 |
| WO | WO 2005/083490 | 9/2005 |

OTHER PUBLICATIONS

ISTFA Nov. 2003, Conference Proceedings from the 29th International Symposium for Testing and Failure Analysis, pp. 325-329.

* cited by examiner

MICROSCOPE AND SAMPLE OBSERVATION METHOD

BACKGROUND OF THE INVENTION

1. Field of the Invention

The present invention relates to a microscope used for observing a sample such as a semiconductor device at a predetermined observation plane and through the sample, and a sample observation method.

2. Related Background Art

In recent years, many of semiconductor devices are being fabricated using face down bonding and flip chip bonding with a device surface (active circuit surface) at the bottom side of a substrate. In inspection of such semiconductor devices, it is sometimes difficult to expose the device surface of the substrate without disassembling a package, depending upon a type of the package and a mounting direction. Even in cases where a device surface of a substrate mounted not using the flip chip mounting can be exposed, but where semiconductor devices are highly integrated or multilayered, it is becoming hard to observe interconnections, devices, etc. in lower layers. Correspondingly, a method proposed is one of observing a semiconductor device through a substrate from the back side opposite the device surface.

The conventional known semiconductor inspection apparatus include an emission microscope (Japanese Patent Application Laid-Open No. H7-190946), an OBIRCH device (Japanese Patent Application Laid-Open No. H6-300824), a time-resolved emission microscope (Japanese Patent Application Laid-Open No. H10-150086), and so on. In observation using such microscopes, since silicon (Si) used as a material of the substrate of the semiconductor device transmits near-infrared light, the observation is carried out using infrared light or the like. In recent years, however, the semiconductor devices as inspected objects are being miniaturized more and more, and it is becoming hard for the conventional inspection apparatus using visible light or infrared light, to analyze the microstructure, because of restrictions from the diffraction limit in the optical system.

For this reason, in a case where the microstructure of a semiconductor device is analyzed to detect an abnormal portion in a circuit pattern such as transistors and interconnections formed in the semiconductor device, an abnormality-existing range is first narrowed down to some extent by an inspection apparatus using visible light or infrared light. Then the narrowed-down range is further observed by a method with an observation apparatus such as an electron microscope with higher resolution to detect an abnormal portion in the semiconductor device.

SUMMARY OF THE INVENTION

The method of performing the observation in high resolution with the electron microscope after the inspection with light as described above has a problem that the inspection of semiconductor device requires a great deal of effort and time, for example, because of complicated preparation and installation of the semiconductor device as an inspected object.

On the other hand, a solid immersion lens (SIL) is known as a lens for enlarging an image of an observed object. The SIL is a lens of hemispherical shape, or of hyperhemispherical shape called a Weierstrass sphere, and is normally a compact lens element about 1 mm in size. When this SIL is placed in contact with the surface of the observed object, it can increase the numerical aperture NA and magnification and implement observation in high spatial resolution. However, inspection with the SIL has not been put to practical use yet in the field of the inspection of semiconductor devices, in view of its handling, observation control, and so on. This is also the case in observation of samples except for the semiconductor devices.

The present invention has been accomplished in order to solve the above problem, and an object of the invention is to provide a microscope capable of readily carrying out observation of a sample necessary for an analysis of microstructure of a semiconductor device and the like, and a sample observation method.

In order to achieve the above object, a microscope according to the present invention is a microscope for observing a sample at a predetermined observation plane, comprising: (1) an optical system comprising an objective lens and adapted to guide an image of the sample; (2) objective lens driving means for driving the objective lens to achieve focusing and aberration correction for the sample; (3) a solid immersion lens arranged movable between an insertion position including an optical axis from the sample to the objective lens and a standby position off the optical axis; (4) solid immersion lens driving means for driving the solid immersion lens to move the solid immersion lens between the insertion position and the standby position; and (5) controlling means for controlling the objective lens driving means and the solid immersion lens driving means; wherein (6) the controlling means has two control modes, a first mode in which the solid immersion lens is located at the standby position by the solid immersion lens driving means and in which the focusing and aberration correction are carried out under a first correction condition set based on a refractive index $n_0$ of the sample and a thickness $t_0$ of the sample up to the observation plane, and a second mode in which the solid immersion lens is located at the insertion position by the solid immersion lens driving means and in which the focusing and aberration correction are carried out under a second correction condition set based on the refractive index $n_0$ and the thickness $t_0$ of the sample, and a refractive index $n_1$, a thickness $d_1$, and a radius of curvature $R_1$ of the solid immersion lens.

A sample observation method according to the present invention is a sample observation method of observing a sample at a predetermined observation plane and through an optical system comprising an objective lens, the sample observation method comprising: (a) a first correction step of placing a solid immersion lens at a standby position off an optical axis from the sample to the objective lens and carrying out focusing and aberration correction under a first correction condition set based on a refractive index $n_0$ of the sample and a thickness $t_0$ of the sample up to the observation plane; (b) a first image observation step of observing a normal image of the sample in a state after completion of the focusing and aberration correction in the first correction step; (c) a second correction step of placing the solid immersion lens at an insertion position including the optical axis from the sample to the objective lens and carrying out focusing and aberration correction under a second correction condition set based on the refractive index $n_0$ and the thickness $t_0$ of the sample, and a refractive index $n_1$, a thickness $d_1$, and a radius of curvature $R_1$ of the solid immersion lens; and (d) a second image observation step of observing an enlarged image of the sample in a state after completion of the focusing and aberration correction in the second correction step.

The microscope and sample observation method described above are adapted for observation of a sample carried out through the sample and at a predetermined observation plane, such as inspection of a semiconductor device carried out from the back side through the substrate, and are configured to perform the observation of the sample on the basis of a switchover between the first mode (normal mode) of carrying out the observation under the observation condition set in view of the optical parameters of the sample in the absence of the solid immersion lens and the second mode (solid immersion lens mode) of carrying out the observation under the observation condition set in view of the optical parameters of the sample and the solid immersion lens in the presence of the solid immersion lens. This makes it feasible to suitably acquire the normal image/the enlarged image in the absence/in the presence of the solid immersion lens, respectively, and thus to readily perform the observation of the microstructure of the sample and the like.

A specific example of the observation of the sample is an example in which the sample is a semiconductor device and in which the semiconductor device is observed from its back side through a substrate. In this case, the aforementioned microscope is used as a semiconductor inspection apparatus, and implements easy accomplishment of inspection such as the analysis of microstructure of the semiconductor device. The optical system for guiding the image of the sample may be provided with image acquiring means for acquiring the image of the sample.

Concerning the focusing for the sample, the microscope is preferably configured so that the objective lens driving means comprises focusing means for changing a distance between the sample and the objective lens to carry out the focusing. Likewise, the sample observation method is preferably configured so that in the first correction step and in the second correction step, the focusing is carried out by changing a distance between the sample and the objective lens.

Concerning the aberration correction, the microscope is preferably configured so that the objective lens comprises a first lens unit and a second lens unit arranged along the optical axis, and so that the objective lens driving means comprises aberration correcting means for changing a spacing between the first lens unit and the second lens unit to carry out the aberration correction. Similarly, the sample observation method is preferably configured so that in the first correction step and in the second correction step, the aberration correction is carried out by changing a spacing between a first lens unit and a second lens unit arranged along the optical axis in the objective lens.

As a specific correction method, the microscope is preferably configured so that the controlling means comprises a first focusing table and a first aberration correction table corresponding to the first correction condition, and a second focusing table and a second aberration correction table corresponding to the second correction condition. Similarly, the sample observation method is preferably configured so that the first correction step and the second correction step are arranged to use a first focusing table and a first aberration correction table corresponding to the first correction condition, and a second focusing table and a second aberration correction table corresponding to the second correction condition. By using the focusing tables and aberration correction tables in this manner, it becomes feasible to readily and surely perform the focusing and aberration correction.

The microscope is preferably configured so that the solid immersion lens driving means is a solid immersion lens moving device comprising: a first arm member to which a solid immersion lens holder for supporting the solid immersion lens is coupled; a first arm member rotation source for rotating the first arm member in a horizontal plane substantially parallel to the sample; a second arm member for holding the first arm member rotation source; and a second arm member rotation source for rotating the second arm member in the horizontal plane and around a rotational axis at a position not coaxial with a rotational axis of the first arm member rotation source.

Using this solid immersion lens moving device, the solid immersion lens can be suitably moved between the insertion position and the standby position, relative to the sample, such as a semiconductor device, and to the objective lens. In this case, further, the solid immersion lens moving device preferably comprises a vertical movement source for moving the second arm member rotation source in a vertical direction perpendicular to the horizontal plane.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
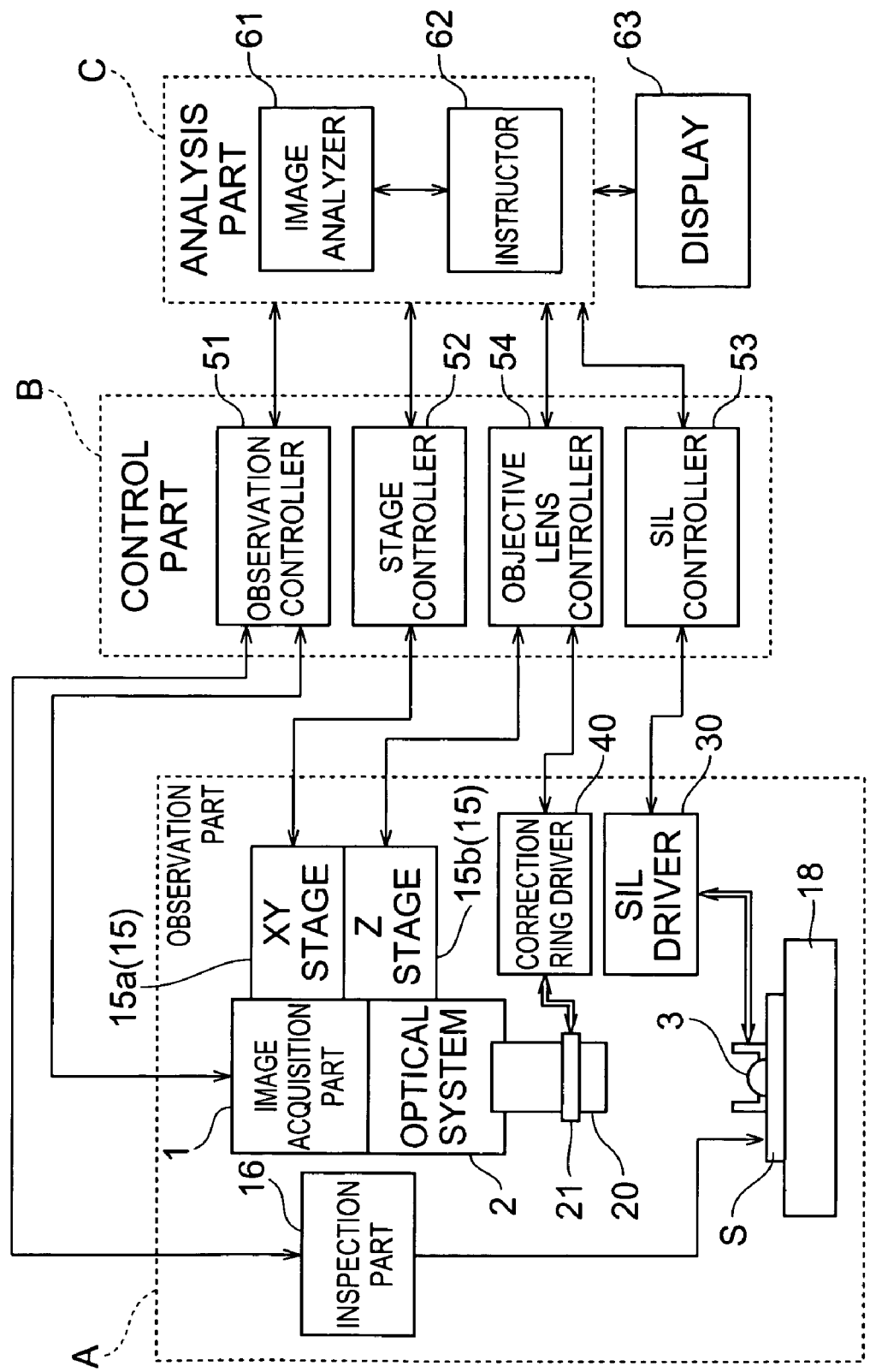
FIG. 1 is a block diagram schematically showing a configuration of an embodiment of the semiconductor inspection apparatus.

Preferred embodiments of the microscope and the sample observation method according to the present invention will be described below in detail with reference to the drawings. In the description of drawings the same elements will be denoted by the same reference symbols, without redundant description. It is also noted that dimensional ratios in the drawings do not always agree with those in the description.

First, a basic configuration of a semiconductor inspection apparatus being a microscope according to the present invention will be described. FIG. 1 is a block diagram schematically showing a configuration of an embodiment of the semiconductor inspection apparatus according to the present invention. The present apparatus is an inspection device adapted for a semiconductor device S, for example, in which a circuit pattern consisting of transistors, interconnections, etc. is formed on a device surface, as a sample of an inspected object (observed object), and is configured to set the device surface at an observation plane and observe to inspect the semiconductor device S through the substrate from the back side opposite the device surface. Here the microscope and sample observation method according to the present invention are applicable to any cases where the observation of the sample is carried out at the predetermined observation plane and through the sample, but the present invention will be described below mainly about the semiconductor inspection apparatus and inspection method as an application example thereof.

The semiconductor inspection apparatus in the present embodiment is comprised of an observation part A for observation of the semiconductor device S, a control part B for control of operations of respective portions in the observation part A, and an analysis part C for processing, instructions, etc. necessary for the inspection of the semiconductor device S. The semiconductor device S as a sample of an inspected object, i.e., an observed object by the present inspection apparatus is mounted on a stage 18 in the observation part A so that a device surface as an observed surface thereof is placed on the stage 18 side and so that the back surface is up.

The observation part A has an image acquisition part 1 housed in a black box (not shown), an optical system 2, and a solid immersion lens (SIL) 3. The image acquisition part 1 is, for example, a means comprised of a photodetector, an image pickup device, or the like and adapted to acquire an image of the semiconductor device S. The optical system 2 for guiding an image of light from the semiconductor device S to the image acquisition part 1 is disposed between the image acquisition part 1, and the semiconductor device S mounted on the stage 18.

The optical system 2 is provided with an objective lens 20 at a predetermined position opposite to the semiconductor device S, to which the light from the semiconductor device S is incident. Light, for example, emerging from or reflected from the semiconductor device S is incident to the objective lens 20 and travels through the optical system 2 including the objective lens 20, to the image acquisition part 1. Then the image acquisition part 1 acquires the image of the semiconductor device S to be used in inspection.

The image acquisition part 1 and the optical system 2 are integrally constructed in a state in which their optical axes are coincident with each other. An XYZ stage 15 consisting of an XY stage 15a and a Z stage 15b is provided for these image acquisition part 1 and optical system 2. The XY stage 15a is used for moving the image acquisition part 1 and optical system 2 in the X-Y plane (horizontal plane) to set the observation position (inspection position) for the semiconductor device S. The Z stage 15b is used for moving the image acquisition part 1 and optical system 2 in the Z direction (vertical direction) to adjust the focal point relative to the semiconductor device S. This permits the Z stage 15b to function as a focusing means for changing the distance between the substrate of the semiconductor device S and the objective lens 20 of the optical system 2 to effect focusing in observation.

Figure 2:
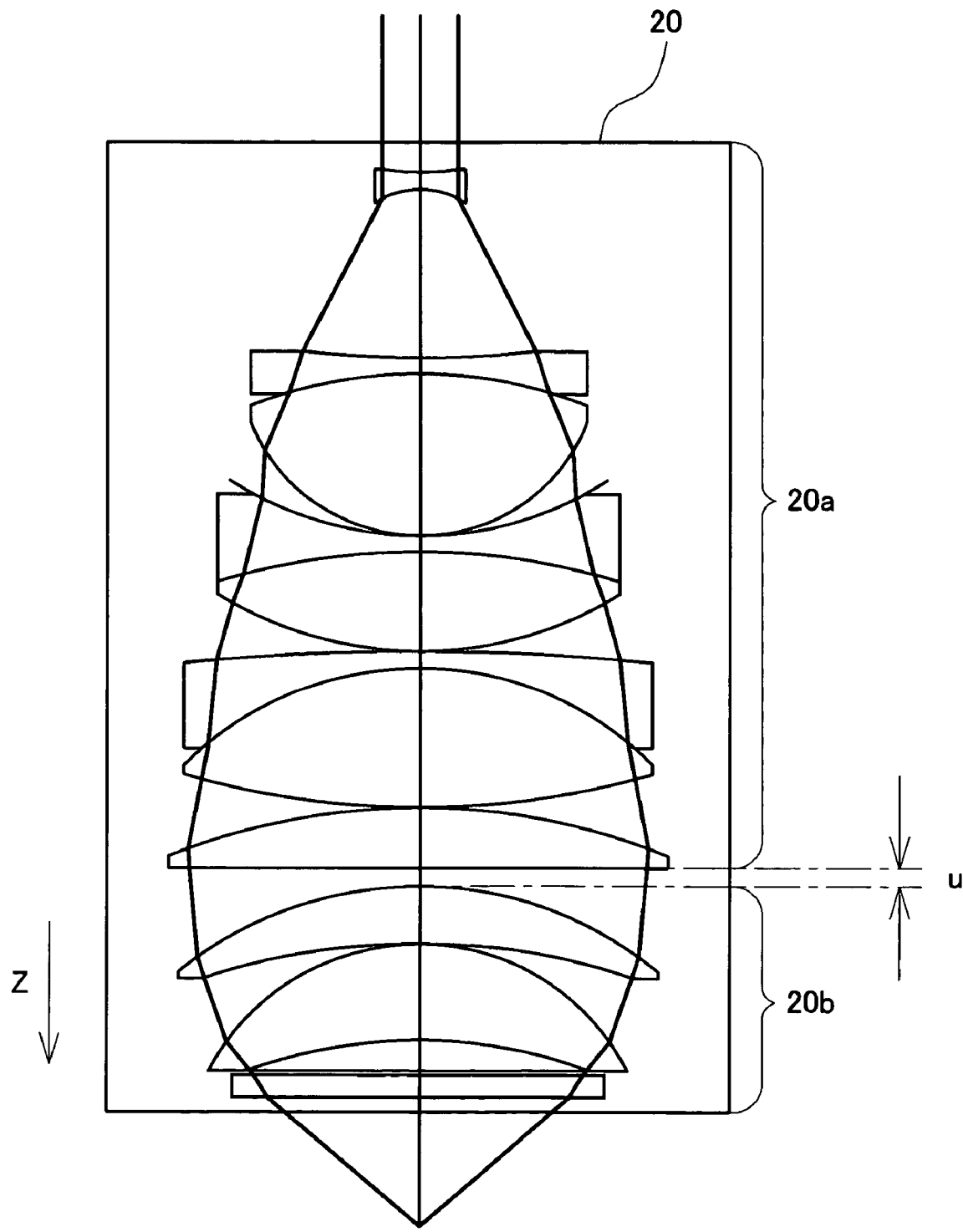
FIG. 2 is a side sectional view showing a configuration of an objective lens in the inspection apparatus shown in FIG. 1.

In the present embodiment, as shown in the side sectional view of FIG. 2, the objective lens 20 is composed of two lens units, first lens unit 20a and second lens unit 20b. These lens units 20a, 20b are located on the upper side and on the lower side, respectively, along the optical axis of the objective lens 20. The objective lens 20 is so configured that a spacing u between the lens units 20a and 20b can be varied by rotating a correction ring 21 (cf. FIG. 1) provided in its peripheral part. The correction ring 21 is controlled in driving by correction ring driver 40. This permits the correction ring 21 and correction ring driver 40 to function as an aberration correction means for effecting aberration correction in observation by changing the spacing u between the lens units 20a, 20b in the objective lens 20.

In the configuration as described above, the focusing means comprised of the Z stage 15b, and the aberration correction means comprised of the correction ring 21 and correction ring driver 40 constitute an objective lens driving means for driving the objective lens 20 to effect the focusing and aberration correction for the semiconductor device S. FIG. 2 is depicted without illustration of a specific structure and driving mechanism of the objective lens 20 including the correction ring 21. It is also possible to drive the stage 18 carrying the semiconductor device S, in order to achieve the focusing for the semiconductor device S.

In the inspection apparatus shown in FIG. 1, an inspection part 16 is provided for the semiconductor device S. In the inspection of semiconductor device S, the inspection part 16 performs control of a state of the semiconductor device S and others according to need. There are different methods of controlling the state of the semiconductor device S by the inspection part 16, depending upon specific inspection methods applied to the semiconductor device S; for example, applicable methods include a method of supplying a voltage to a predetermined portion of a circuit pattern formed in the semiconductor device S, a method of irradiating a laser beam as a probe beam to the semiconductor device S, and so on.

In the present embodiment, SIL 3 is further disposed in this observation part A. This SIL 3 is a lens used for magnifying the image of the semiconductor device S. The SIL 3 is arranged movable relative to the image acquisition part 1 and optical system 2 and relative to the semiconductor device S mounted on the stage 18. Specifically, the SIL 3 is arranged to be movable between an insertion position at which the SIL 3 is placed so as to include the optical axis from the semiconductor device S to the objective lens 20 and be kept in contact with the semiconductor device S, and a standby position off the optical axis.

A solid immersion lens driver (SIL driver) 30 is provided for the SIL 3. The SIL driver 30 is a driving means for driving the SIL 3 to move it between the aforementioned insertion position and standby position. The SIL driver 30 finely moves the location of SIL 3 to adjust the insertion position of SIL 3 relative to the objective lens 20 of the optical system 2. In FIG. 1, the SIL 3 is illustrated in a state in which it is placed at the insertion position between the objective lens 20 and the semiconductor device S.

Here the SIL is usually a lens of hemispherical shape with the focal point at the center of sphere effecting n-fold multiplication of the numerical aperture NA and magnification, or a lens of hyperhemispherical shape with the focal point at a position R/n below the center of sphere, effecting $n^2$-fold multiplication of the numerical aperture NA and magnification (e.g., cf. Japanese Patent Application Laid-Open No. 2002-189000).

Figure 3:
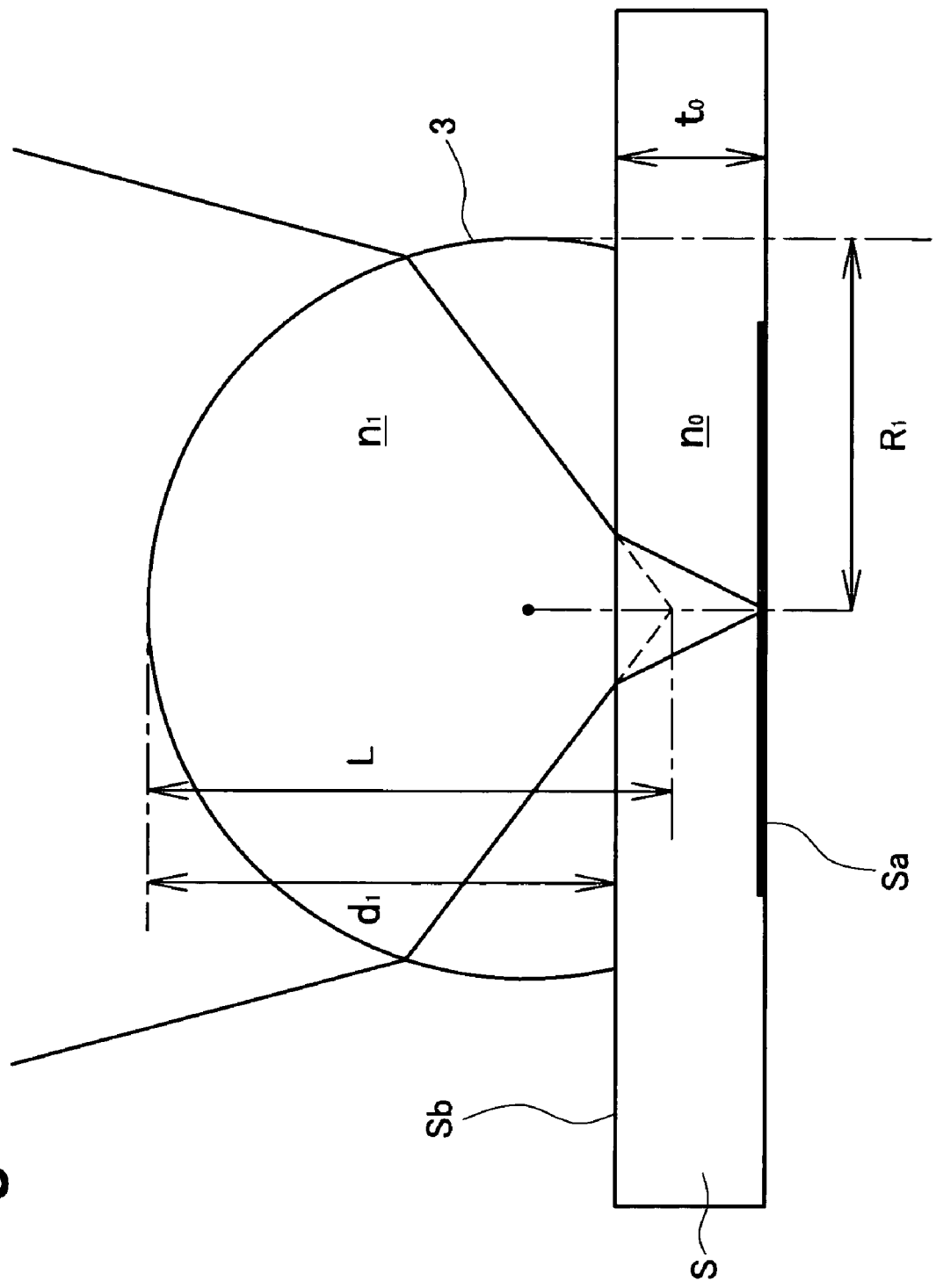
FIG. 3 is a side view showing a semiconductor device observation method with an SIL in the inspection apparatus shown in FIG. 1.

FIG. 3 is a side view showing an observation method of the semiconductor device using the SIL in the inspection apparatus shown in FIG. 1. In the present inspection apparatus, as described above, the semiconductor device S is placed on the stage 18 so that the device surface Sa thereof is down (on the stage 18 side) and the back surface Sb up (on the objective lens 20 side). Relative to this semiconductor device S, the SIL 3 at the insertion position is placed so that its planar or convex lens surface is kept in close contact with the back surface Sb. Specific examples of the SIL include such known lenses as plano-convex lenses and bi-convex lenses (e.g., reference should be made to Japanese Patent Application Laid-Open No. H5-157701 and U.S. Pat. No. 6,594,086).

Where the semiconductor device S is observed from the back side Sb through the substrate by use of the objective lens 20 and SIL 3, the optical parameters in the semiconductor device S include the refractive index $n_0$ and the thickness $t_0$ of the substrate. The optical parameters in the SIL 3 include the refractive index $n_1$, thickness $d_1$, and curvature radius $R_1$ of the spherical lens surface. In FIG. 3, solid lines indicate optical paths traveling from the objective lens 20 side through the SIL 3 and the substrate and focused on the device surface Sa. In addition, dashed lines indicate optical paths on the assumption that the refractive index $n_0$ of the substrate of the semiconductor device S would be equal to that $n_1$ of SIL 3.

In the same drawing L represents a depth of measurement from the spherical surface of the solid immersion lens, SIL 3 in the case of the optical paths indicated by the dashed lines, i.e., a distance between the focal point determined from the shape of the lens surface of SIL 3 and the apex of SIL 3 (hereinafter referred to as a measurement depth). This measurement depth L is determined by $L = d_1 + t_0 \times (n_1/n_0)$ so as to set the focal point on the device surface Sa in actual observation. A specific lens shape of the SIL 3 (e.g., setting of thickness $d_1$ to curvature radius $R_1$) can be optionally set according to need. In general, as to the thickness $t_0$ of the substrate (sample), where the observation is carried out at the observation plane set inside the sample and through part of the sample, the thickness of the sample up to the observation plane can be set as the thickness $t_0$.

For the observation part A for carrying out the observation and others for inspection of the semiconductor device S, there are provided the control part B and analysis part C.

The control part B has an observation controller 51, a stage controller 52, an SIL controller 53, and an objective lens controller 54. The observation controller 51 controls operations of the image acquisition part 1 and inspection part 16, thereby controlling execution of observation of the semiconductor device S carried out in the observation part A, setting of observation conditions, and so on.

The stage controller 52 controls the operation of XY stage 15a, thereby controlling setting of the observation position of the semiconductor device S by the image acquisition part 1 and optical system 2 as an inspection position in the present inspection apparatus, or positioning thereof. The SIL controller 53 controls the operation of SIL driver 30, thereby controlling movement of the SIL 3 between the insertion position and the standby position, or adjustment of the insertion position of SIL 3, or the like.

The objective lens controller 54 controls the operation of the Z stage 15b, thereby controlling the focusing to change the distance between the substrate of the semiconductor device S and the objective lens 20. Furthermore, this controller 54 controls the operations of the correction ring driver 40 and the correction ring 21, thereby controlling the aberration correction to change the spacing u between the lens units 20a, 20b in the objective lens 20.

The analysis part C has an image analyzer 61 and instructor 62. The image analyzer 61 performs a required analysis process and others for the image acquired by the image acquisition part 1. The instructor 62 gives necessary instructions for the control part B, with reference to input contents from an operator, analysis contents by the image analyzer 61, and so on. A display unit 63 is coupled to the analysis part C. An image, data, or the like acquired or analyzed by the analysis part C is displayed on the display unit 63 as occasion may demand.

In this configuration, the control part B serves as a controlling means for controlling the objective lens driving means including the Z stage 15b, correction ring driver 40, and correction ring 21, and the solid immersion lens driving means including the SIL driver 30, to control the observation conditions in observation of the device surface Sa of the semiconductor device S. In the present embodiment, particularly, corresponding to the configuration wherein the SIL 3 is movable between the insertion position and the standby position, the control part B including the SIL controller 53 and the objective lens controller 54 has two control modes, a normal mode (first mode) and a solid immersion lens mode (SIL mode or second mode).

In the normal mode, the SIL controller 53 makes the SIL driver 30 place the SIL 3 at the standby position off the optical axis. The objective lens controller 54 controls the Z stage 15b, correction ring driver 40, and correction ring 21 to perform the focusing and aberration correction in observation conditions, under a first correction condition set based on the refractive index $n_0$ and thickness $t_0$ of the substrate of the semiconductor device S. Then the observation of the semiconductor device S from the back side Sb is carried out through the optical system 2 including the objective lens 20. The objective lens controller 54 is provided with a first focusing table and a first aberration correction table corresponding to the first correction condition.

In the SIL mode, the SIL controller 53 makes the SIL driver 30 place the SIL 3 at the insertion position including the optical axis. The objective lens controller 54 controls the Z stage 15b, correction ring driver 40, and correction ring 21 to perform the focusing and aberration correction in observation conditions, under a second correction condition set based on the refractive index $n_0$ and thickness $t_0$ of the substrate of the semiconductor device S, and the refractive index $n_1$, thickness $d_1$, and curvature radius $R_1$ of SIL 3. Then the observation of the semiconductor device S from the back side Sb is carried out through the optical system 2 including the objective lens 20, and through the SIL 3. The objective lens controller 54 is provided with a second focusing table and a second aberration correction table corresponding to this second correction condition.

Figure 4:
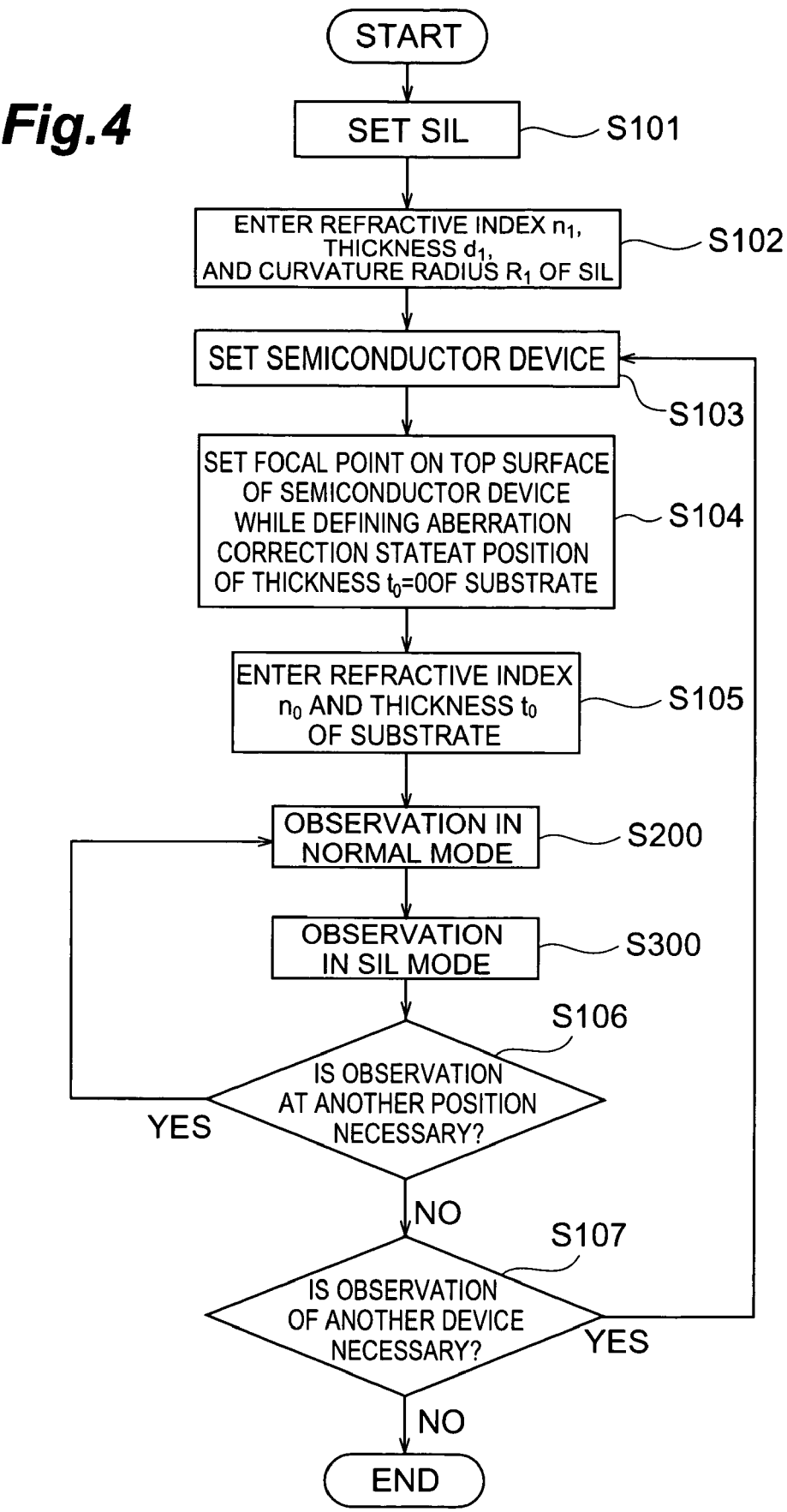
FIG. 4 is a flowchart showing an example of a semiconductor inspection method using the inspection apparatus shown in FIG. 1.
Figure 5:
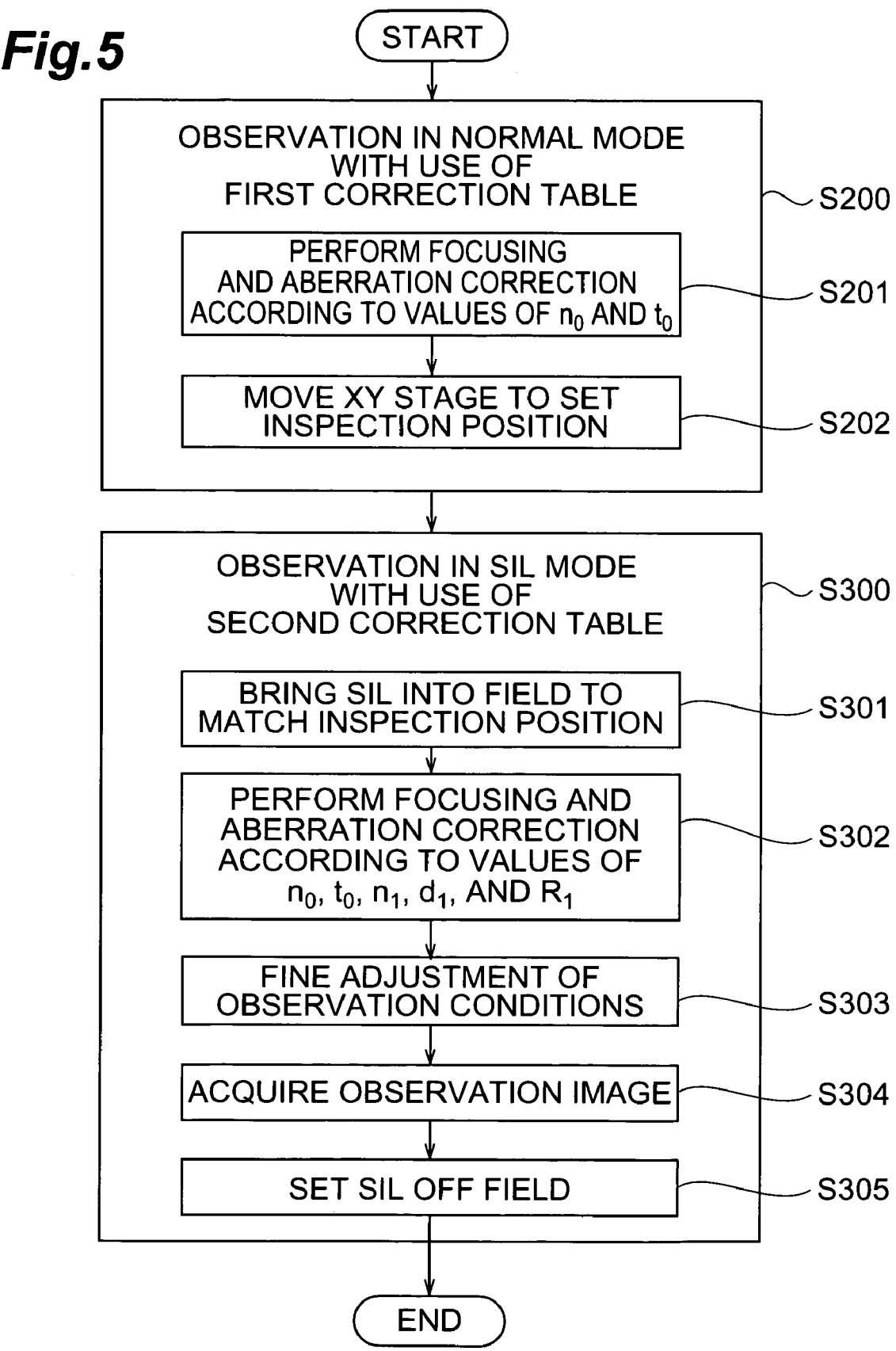
FIG. 5 is a flowchart showing observation in a normal mode and observation in an SIL mode in the inspection method shown in FIG. 4.
Figure 6A:
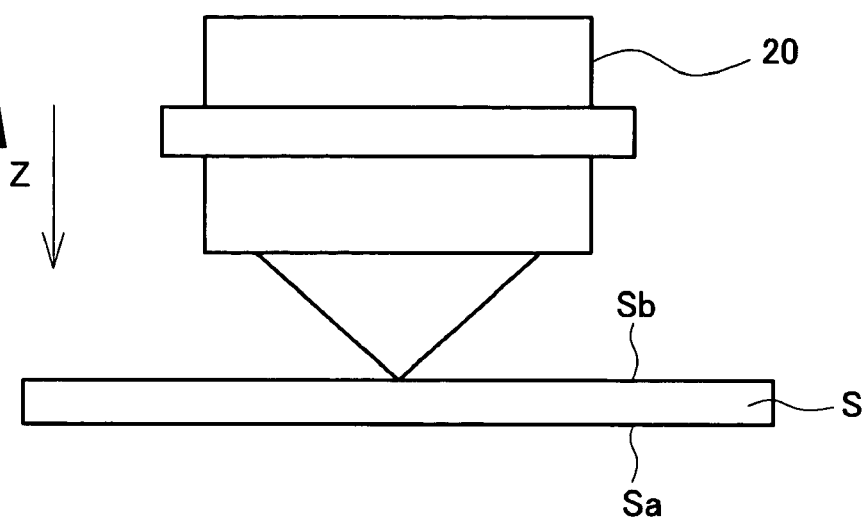
FIGS. 6A to 6C are schematic diagrams showing (A) a default state, (B) a normal mode, and (C) an SIL mode in the observation of the semiconductor device.
Figure 6B:
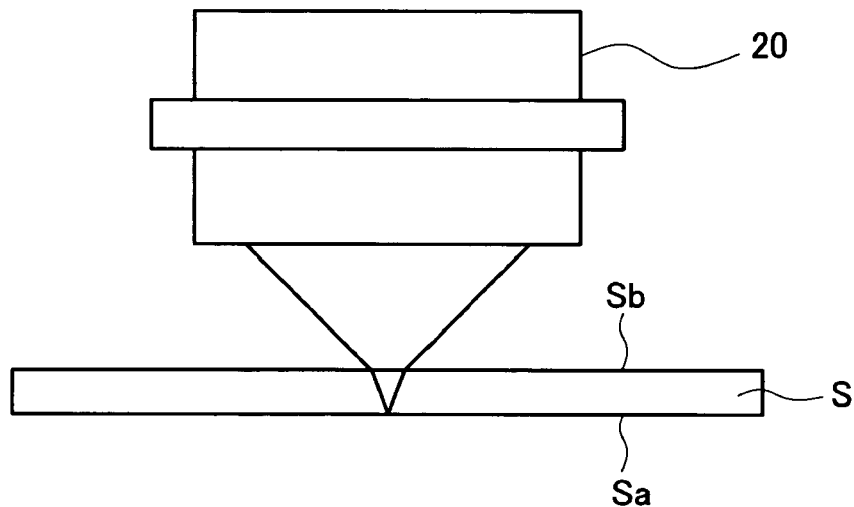
Figure 6C:
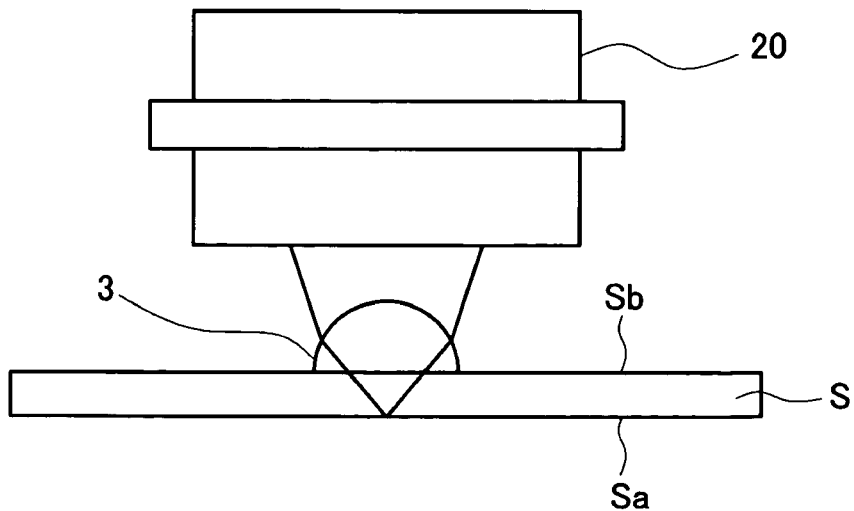

Next, a semiconductor inspection method, which is a sample observation method according to the present invention, will be described. FIG. 4 is a flowchart showing an example of the semiconductor inspection method using the inspection apparatus shown in FIG. 1. FIG. 5 is a flowchart specifically showing observation methods by observation in the normal mode and observation in the SIL mode in the inspection method shown in FIG. 4. FIGS. 6A to 6C are schematic diagrams showing (A) the default state, (B) the normal mode, and (C) the SIL mode in observation of a semiconductor device.

The first step is to select an SIL 3 having optical parameters suitable for observation of the semiconductor device S as an inspected object and to set the SIL 3 on the SIL driver 30 (step S101). Then the optical parameters of the refractive index $n_1$, thickness $d_1$, and curvature radius $R_1$ of the selected SIL 3 are entered through an input device provided in the analysis part C (S102). The semiconductor device S as an inspected object is set with its back side Sb up on the stage 18 (S103). Then the focal point of observation is matched with the back side Sb of the semiconductor device S thus set. This results in setting the focus and aberration so as to locate the focal point on the back side Sb being the top surface of the semiconductor device S, as shown in FIG. 6A (S104). This state, i.e., the thickness of substrate $t_0=0$ is the default state (origin set state) in observation of the semiconductor device S. In this state the SIL 3 is positioned at the standby position off the optical axis.

Next, the optical parameters of the refractive index $n_0$ and thickness $t_0$ of the substrate of the semiconductor device S being a sample of an observed object are entered (S105).

Subsequently, the semiconductor device S is observed in the normal mode with use of the objective lens 20 (S200). Specifically, as shown in the flowchart of FIG. 5, the movement amount $\Delta Z$ of the objective lens 20 and the spacing u between lens units 20a, 20b are adjusted using the first focusing table and the first aberration correction table according to the refractive index $n_0$ and the thickness $t_0$ of the substrate. This results in executing the focusing and aberration correction so as to match the focal point with the device surface Sa set at the observation plane of the semiconductor device S and through the substrate from the back side Sb, as shown in FIG. 6B (S201, first correction step).

After completion of the setting of the observation conditions, an observation for inspection of the semiconductor device S is carried out (S202, first image observation step).

At this step, a normal image of a circuit pattern provided in the device surface Sa of the semiconductor device S is observed through the optical system 2 containing the objective lens 20, by the image acquisition part 1. The stage controller 52 drives the XY stage 15a to move the image acquisition part 1 and optical system 2 in the X-Y plane. Then a portion to be observed in the semiconductor device S is set at the center of the field of view and is specified as an inspection position (observation position).

Subsequently, an observation is carried out in the SIL mode using the SIL 3 in addition to the objective lens 20 (S300). Specifically, the SIL controller 53 drives the SIL driver 30 to move the SIL 3 from the standby position to the insertion position. Then the SIL 3 is brought into the field so as to match the inspection position, in a state in which the SIL 3 is in close contact with the back side Sb of the semiconductor device S (S301). In this state, the movement amount $\Delta Z$ of the objective lens 20, and the spacing u between lens units 20a, 20b are adjusted using the second focusing table and the second aberration correction table according to the refractive index $n_0$ and thickness $t_0$ of the substrate, and the refractive index $n_1$, thickness $d_1$, and curvature radius $R_1$ of the SIL 3. This results in executing the focusing and aberration correction so as to match the focal point with the device surface Sa of the semiconductor device S through the SIL 3 and the substrate, as shown in FIG. 6C (S302, second correction step). Fine adjustment is carried out as to the observation conditions such as the focal point, aberration, and the location of the SIL 3 as occasion may demand (S303).

After completion of the setting of the observation conditions, the observation of the semiconductor device S is carried out (S304, second image observation step). At this step, an enlarged image of the semiconductor device S is observed through the optical system 2 containing the objective lens 20, and through the SIL 3 by the image acquisition part 1 to inspect a circuit pattern at the inspection position. After completion of the necessary observation and inspection for the set inspection position, the SIL 3 is moved out of the field to the standby position (S305).

Then, whether it is necessary to observe another position is determined for the semiconductor device S set on the stage 18, as shown in the flowchart of FIG. 4 (S106). If necessary, the observation in the normal mode (S200) and the observation in the SIL mode (S300) are repeatedly carried out. If there is no need for observation of another position, it is determined whether it is necessary to observe another semiconductor device (S107). If necessary, the processes including the step of setting the semiconductor device S (S103) and the steps thereafter are repeatedly carried out. If there is no need for observation of another semiconductor device, the inspection of semiconductor device is terminated.

The effects of the semiconductor inspection apparatus and semiconductor inspection method in the present embodiment will be described below.

In the semiconductor inspection apparatus shown in FIG. 1 and in the semiconductor inspection method shown in FIGS. 4 and 5, the inspection of the semiconductor device S from the back side Sb through the substrate is carried out so as to implement the inspection with a switchover between the normal mode of carrying out the observation with the SIL 3 at the standby position and under the observation conditions taking account of the optical parameters $n_0$, $t_0$ of the substrate and the SIL mode of carrying out the observation with the SIL 3 at the insertion position and under the observation conditions taking account of the optical parameters $n_0$, $t_0$ of the substrate and the optical parameters $n_1$, $d_1$, $R_1$ of the SIL 3. This makes it feasible to properly execute the focusing and aberration correction in each of the present and absent states of SIL 3 and to suitably acquire each of the normal image and the enlarged image of the semiconductor device S. Accordingly, it becomes feasible to readily carry out the inspection such as the analysis of microstructure of the semiconductor device S.

The above embodiment employs the Z stage 15b to adjust the spacing between the substrate of the semiconductor device S and the objective lens 20, as the focusing means for the objective lens 20. The above embodiment also adopts the lens configuration consisting of the lens units 20a, 20b and the correction ring 21 and the correction ring driver 40 for adjustment of the spacing between the lens units, as the aberration correction means for the objective lens 20. This configuration permits us to suitably adjust the focus and aberration in observation of the semiconductor device S. It is also a matter of course that any configuration other than these may be used. For example, as to the focusing for the semiconductor device S, it is also possible to adopt the configuration of driving the stage 18 carrying the semiconductor device S in the Z-axis direction as described above.

The focusing and aberration correction are executed by the specific methods using the focusing tables and aberration correction tables prepared corresponding to the respective correction conditions in the control part B. This implements easy and sure correction for the observation conditions for the semiconductor device S. However, the focusing and aberration correction can also be implemented by use of any other method than the above methods using the focusing tables and aberration correction tables. For example, a potential configuration is such that computational expressions necessary for focusing and aberration correction are prepared and conditions for focusing and aberration correction are calculated using the computational expressions.

In the configuration shown in FIG. 1, specifically, the focusing tables are preferably prepared based on Z-directional driving distances (focus movement amounts) $\Delta Z$ of the objective lens 20 by the Z stage 15b. The aberration correction tables are preferably prepared based on spacings u between lens units 20a, 20b in the objective lens 20 or based on amounts of rotation of the correction ring 21 corresponding to spacings u.

These correction tables may be arranged as follows: tables are preliminarily prepared in the number necessary for combinations of optical parameters of envisioned substrates and SILs and a table to be used is selected according to input parameters. Alternatively, a correction table may be created at a point of time of entry of parameters. The entry of the optical parameters of SIL can be implemented by individually entering values of parameters, or by any other method, for example, by a configuration of preparing a set of parameters corresponding to each model number of SIL, by a configuration of providing each SIL with a storage medium such as an IC chip storing values of parameters, and retrieving the data at a time of use, and so on.

Listed below are principal materials to be used for the semiconductor substrate and SIL, and refractive indices n thereof.

Si: 3.5
GaP: 3.1
GaAs: 3.4
Glass: 1.45–2
Plastics: 1.45–2

The material of SIL is preferably selected as one with a refractive index close to that of the substrate material such as Si or GaP in the semiconductor device as an inspected object. The above embodiment described the semiconductor inspection apparatus and inspection method for the semiconductor device as a sample of an observed object, and in general, where samples are a variety of devices such as the semiconductor devices, the target devices do not have to be limited to those using a semiconductor substrate, but observed objects may also be integrated circuits using a substrate of glass, plastic, or the like, such as polysilicon thin-film transistors. For example, a device is fabricated on a glass substrate in the case of a liquid crystal device, and a device is fabricated on a plastic substrate in the case of an organic EL device or the like.

Where the SIL used is one made of Si, it presents an advantage of no aberration at the interface between the substrate and the SIL if the substrate is an Si substrate. However, attention is needed in that the transmittance is low for light of wavelengths of not more than 1.1 μm and the light is absorbed by the SIL even if the substrate is made thin.

Where the SIL used is one made of GaP, it presents an advantage of also transmitting light with wavelengths ranging from the visible region to 1.1 μm, in addition to the wavelength region transmitted by Si. In this case, if the Si substrate has a thickness small enough, the observation can be performed in such a wavelength region. For example, where the Si substrate has the thickness as thin as about 30 μm and where a laser beam with the wavelength of not more than 1 μm is used in acquisition of an image by LSM (described later), it is feasible to implement achievement of high resolution of observation. On the other hand, attention is needed in that the GaP SIL gives rise to geometric aberration like spherical aberration due to the index difference at the interface between the substrate and the SIL in the case of the Si substrate. When the substrate is thin enough as described above, the effect of geometric aberration can be ignored.

The semiconductor inspection method described above will be further described with specific data.

First, the correction for the observation conditions in the normal mode will be described. In the observation of the device surface Sa of the semiconductor device S with the objective lens 20 (cf. FIG. 6B), the geometric aberration I appearing on the back side Sb of the substrate is given by Eq (1) below.

$$I = (n_0^2 - 1) t_0 NA^2 / (2n_0^3) \quad (1)$$

In this Eq (1), NA represents the numerical aperture of the objective lens 20.

Figure 7:
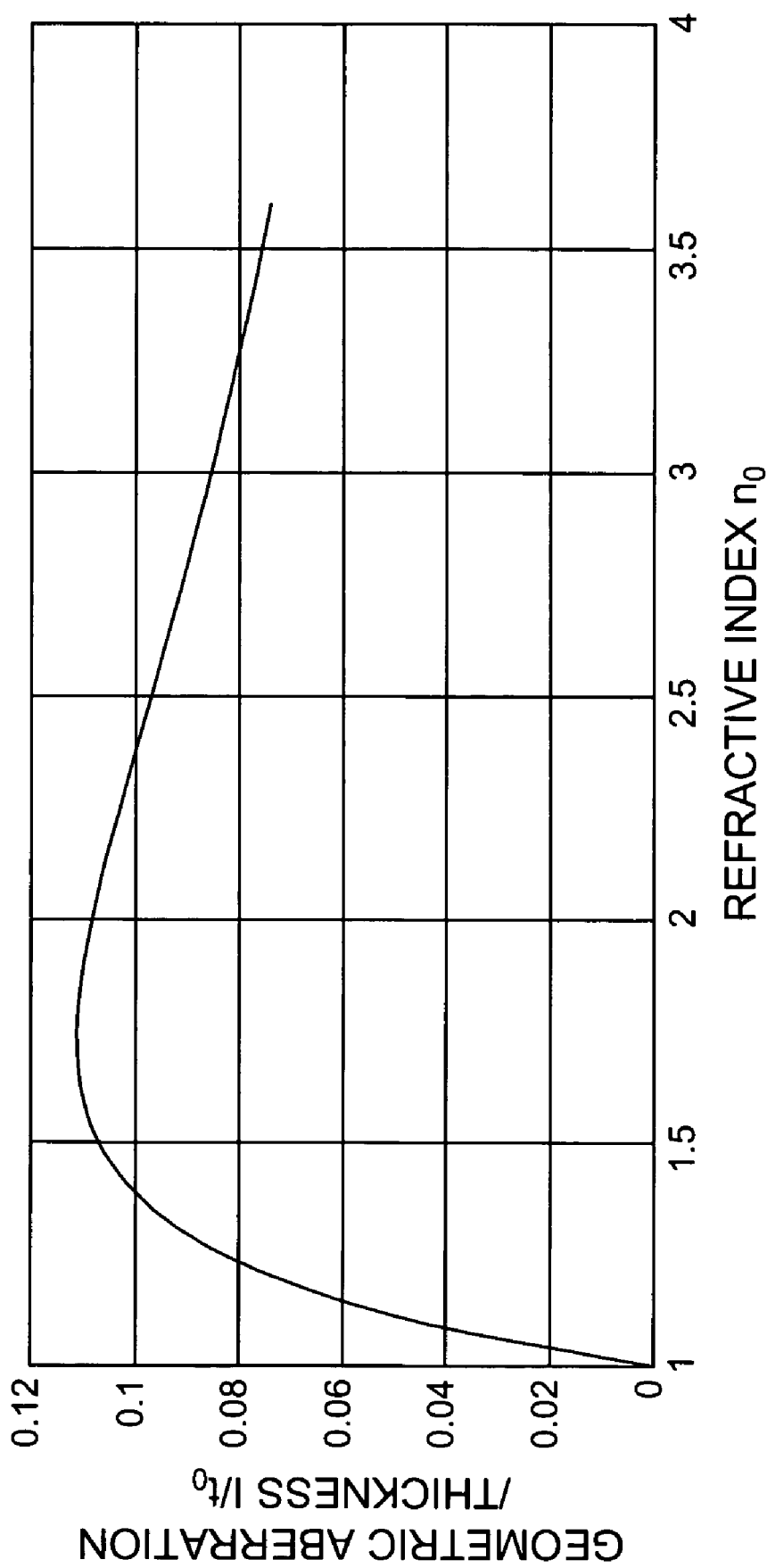
FIG. 7 is a graph showing an example of correlation between refractive index of substrate, and geometric aberration.

FIG. 7 is a graph showing an example of correlation between refractive index of substrate and geometric aberration. In this graph, the horizontal axis represents the refractive index $n_0$ of the substrate (sample) as an observed object, and the vertical axis (geometric aberration/thickness of substrate) $I/t_0$. In this graph, the numerical aperture of the objective lens 20 is assumed to be NA=0.76. In the correction for the observation conditions in the normal mode, the focusing table and aberration correction table are prepared based on the optical characteristics such as the geometric aberration I determined in this way.

Figure 8:
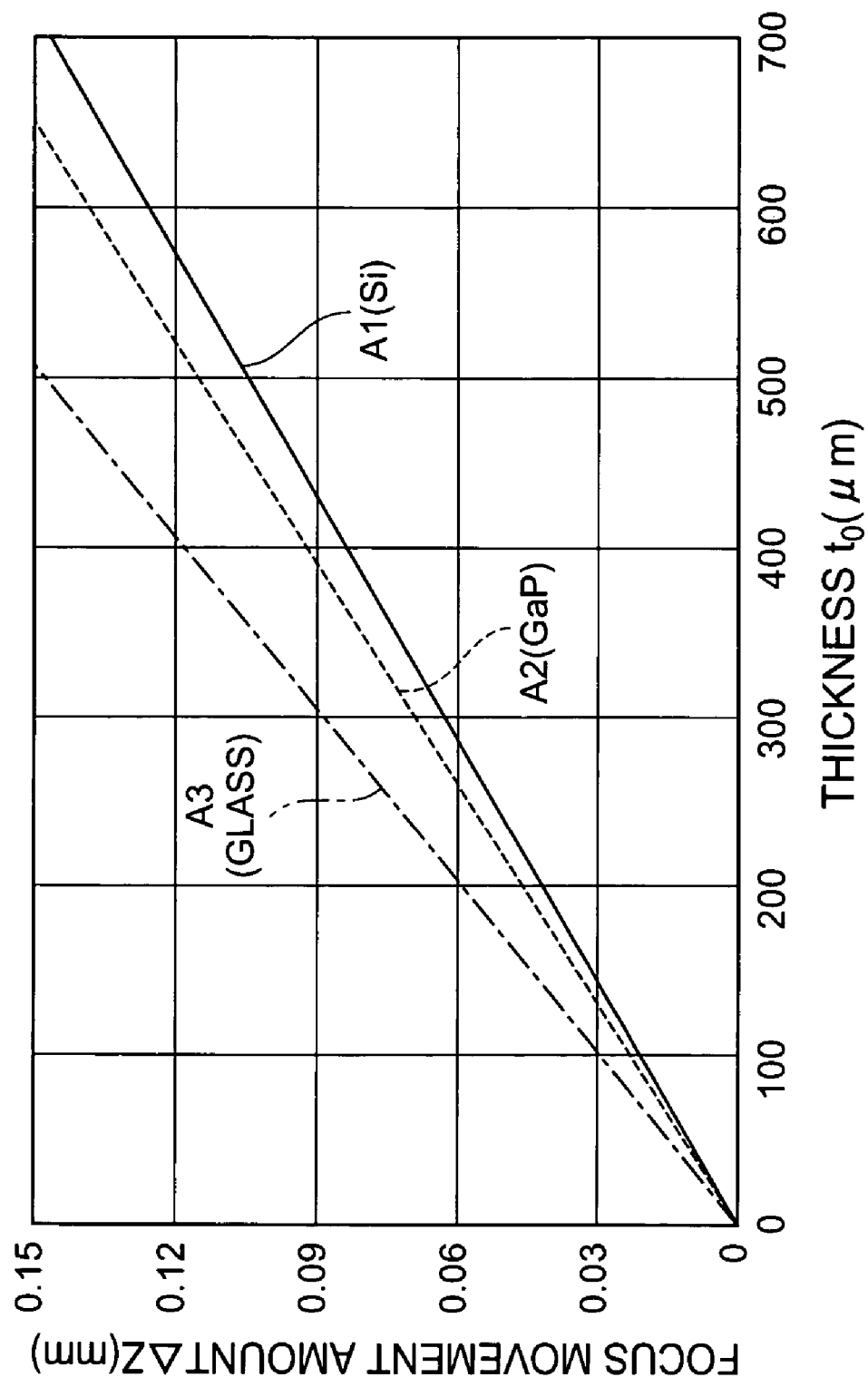
FIG. 8 is a graph showing an example of correlation between thickness of substrate, and focus movement amount.

FIG. 8 is a graph showing an example of correlation between thickness of substrate and focus movement amount of movement of the objective lens. In this graph, the horizontal axis represents the thickness $t_0$ (μm) of the substrate, and the vertical axis the focus movement amount $\Delta Z$ (mm). Graph A1 indicates a correlation in the case of the substrate material of Si ($n_0$=3.5), graph A2 that in the case of the substrate material of GaP ($n_0$=3.1), and graph A3 that in the case of the substrate material of glass ($n_0$=1.5). As apparent from Eq (1), if NA and $n_0$ are constant, the geometric aberration I is proportional to the thickness $t_0$ of the substrate. In the example shown in FIG. 8, therefore, the focus movement amount $\Delta Z$ for focusing can be calculated by a proportional expression to the thickness $t_0$ or the geometric aberration I.

Figure 9:
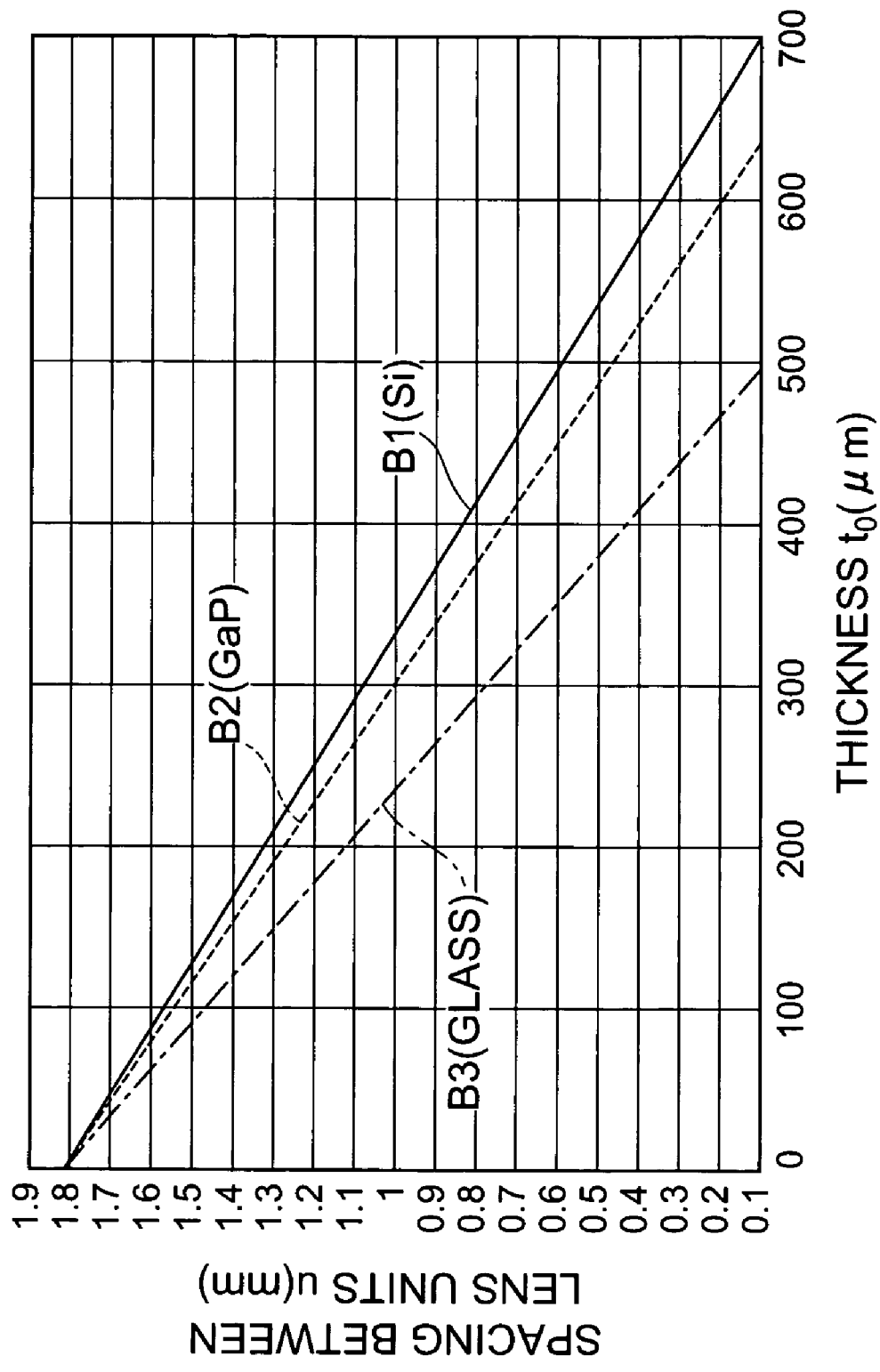
FIG. 9 is a graph showing an example of correlation between thickness of substrate and spacing between lens units in the objective lens.

FIG. 9 is a graph showing an example of correlation between thickness of substrate and spacing between lens units in the objective lens. In this graph, the horizontal axis represents the thickness $t_0$ (μm) of the substrate, and the vertical axis the spacing u (mm) between lens units 20a, 20b set in the objective lens 20. Graph B1 indicates a correlation in the case of the substrate material of Si, graph B2 that in the case of the substrate material of GaP, and graph B3 that in the case of the substrate material of glass. In the example shown in FIG. 9, the spacing u between lens units for aberration correction can be calculated by a linear expression to the thickness $t_0$ or the geometric aberration I. In FIGS. 8 and 9, specific correlation equations including coefficient values and others are determined by a lens configuration of each objective lens 20 or the like. A function system including the order of the correlation equations and others can be optionally determined out of appropriate systems.

Next, the correction for the observation conditions in the SIL mode will be described. In the observation of the device surface Sa with the SIL 3 in addition to the objective lens 20 (cf. FIG. 6C), the geometric aberration I amounts to the sum I=I1+I2 of the geometric aberration I1 appearing at the lens spherical surface of SIL 3 and the geometric aberration I2 appearing at the interface between SIL 3 and the substrate. The geometric aberration I1 appearing at the lens spherical surface of SIL 3 is given by Eq (2) below, supposing $R_1$=1 mm and $n_1$=3.5 for simplicity.

$$I1 = 6.25(L-1)^2 \times (3.5L - 4.5)L \quad (2)$$

In this Eq (2), L represents the measurement depth of SIL 3 shown in FIG. 3.

The geometric aberration I2 appearing at the interface between SIL 3 and the substrate is given by Eq (3) below.

$$I2 = n_1(n_0^2 - n_1^2) t_0 NA^2 / (2n_0^3) \quad (3)$$

In the correction for the observation conditions in the SIL mode, the focusing table and aberration correction table are prepared based on the optical characteristics such as the geometric aberrations I1, I2 determined in this way.

Figure 10:
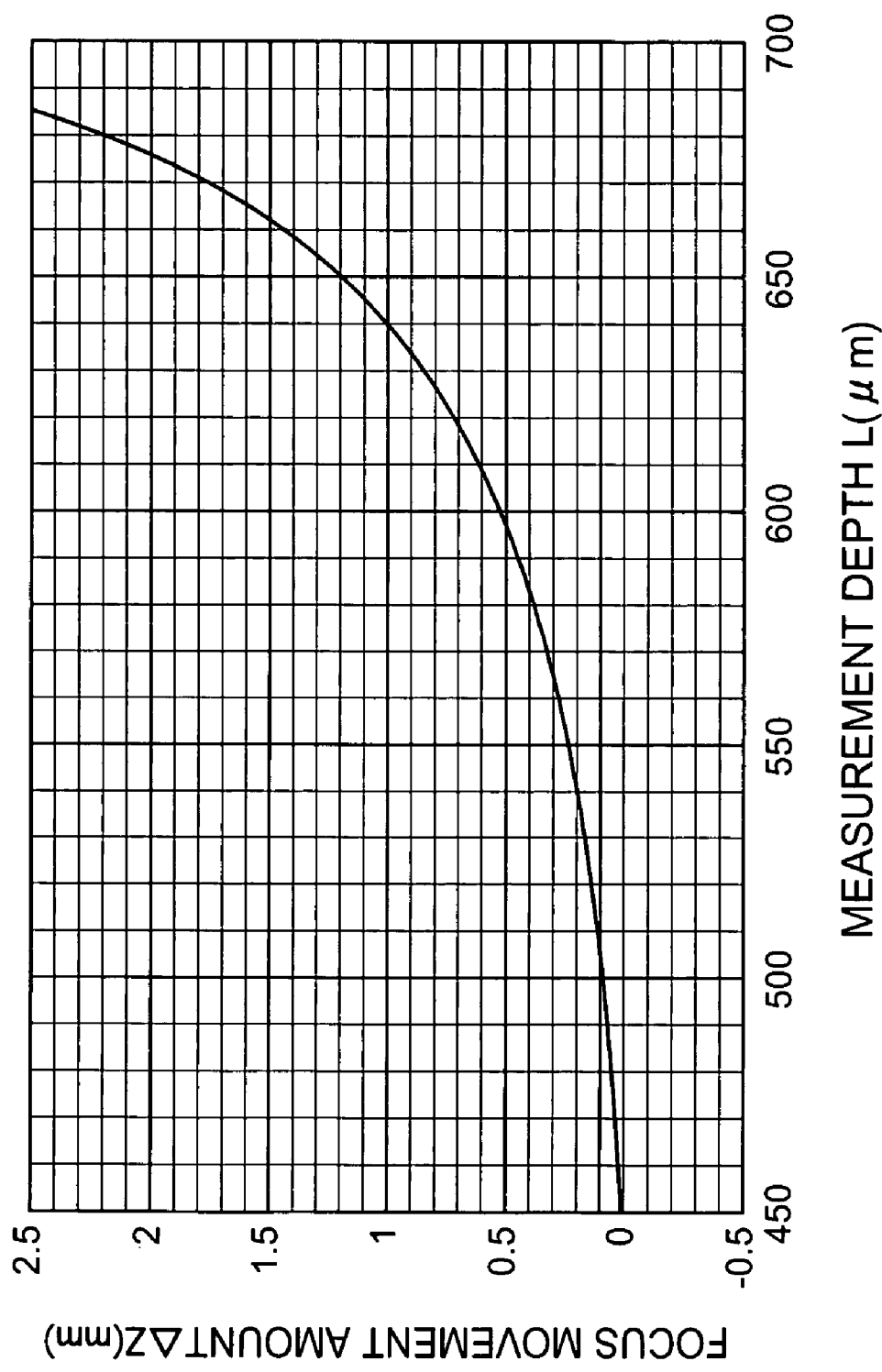
FIG. 10 is a graph showing an example of correlation between depth of measurement and focus movement amount.

FIG. 10 is a graph showing an example of correlation between measurement depth and focus movement amount. In this graph, the horizontal axis represents the measurement depth L (μm), and the vertical axis the focus movement amount $\Delta Z$ (mm). In this graph, the optical parameters of the substrate are set as $n_0$=3.5 and $t_0$=100 μm, and the optical parameters of the SIL 3 as $n_1$=3.1 and $R_1$=0.5 mm. The thickness $d_1$ of SIL 3 varies with the measurement depth L according to the aforementioned equation of $L = d_1 + t_0 \times (n_1/n_0)$. The focus movement amount $\Delta Z$ for focusing is calculated by the correlation as shown in this FIG. 10.

Figure 11:
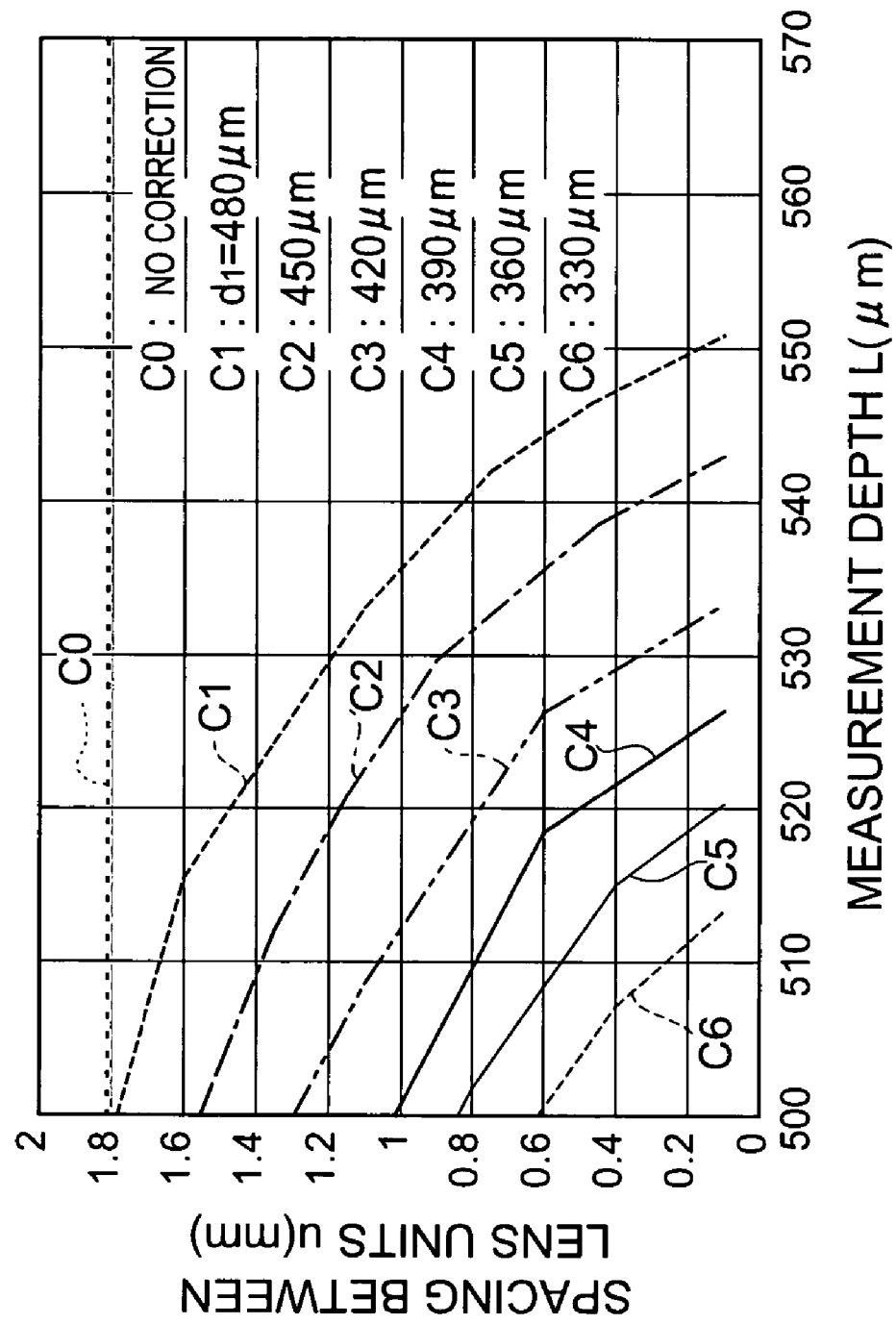
FIG. 11 is a graph showing an example of correlation between depth of measurement and spacing between lens units in the objective lens.

FIG. 11 is a graph showing an example of correlation between measurement depth and spacing between lens units in the objective lens. In this graph, the horizontal axis represents the measurement depth L (μm), and the vertical axis the spacing u (mm) between lens units 20a, 20b. This graph shows corrected states where the optical parameter of the substrate is $n_0$=3.5, the optical parameters of the SIL 3 are $n_1$=3.1 and $R_1$=0.5 mm, and attained NA is 2.2. Graph C0 indicates a state without correction, graph C1 a corrected state at the thickness $d_1$=480 μm of SIL 3, C2 that at $d_1$=450 μm, C3 that at $d_1$=420 μm, C4 that at $d_1$=390 μm, C5 that at $d_1$=360 μm, and C6 that at $d_1$=330 μm. The thickness $t_0$ of the substrate varies with the measurement depth L according to the aforementioned equation of L.

Figure 12:
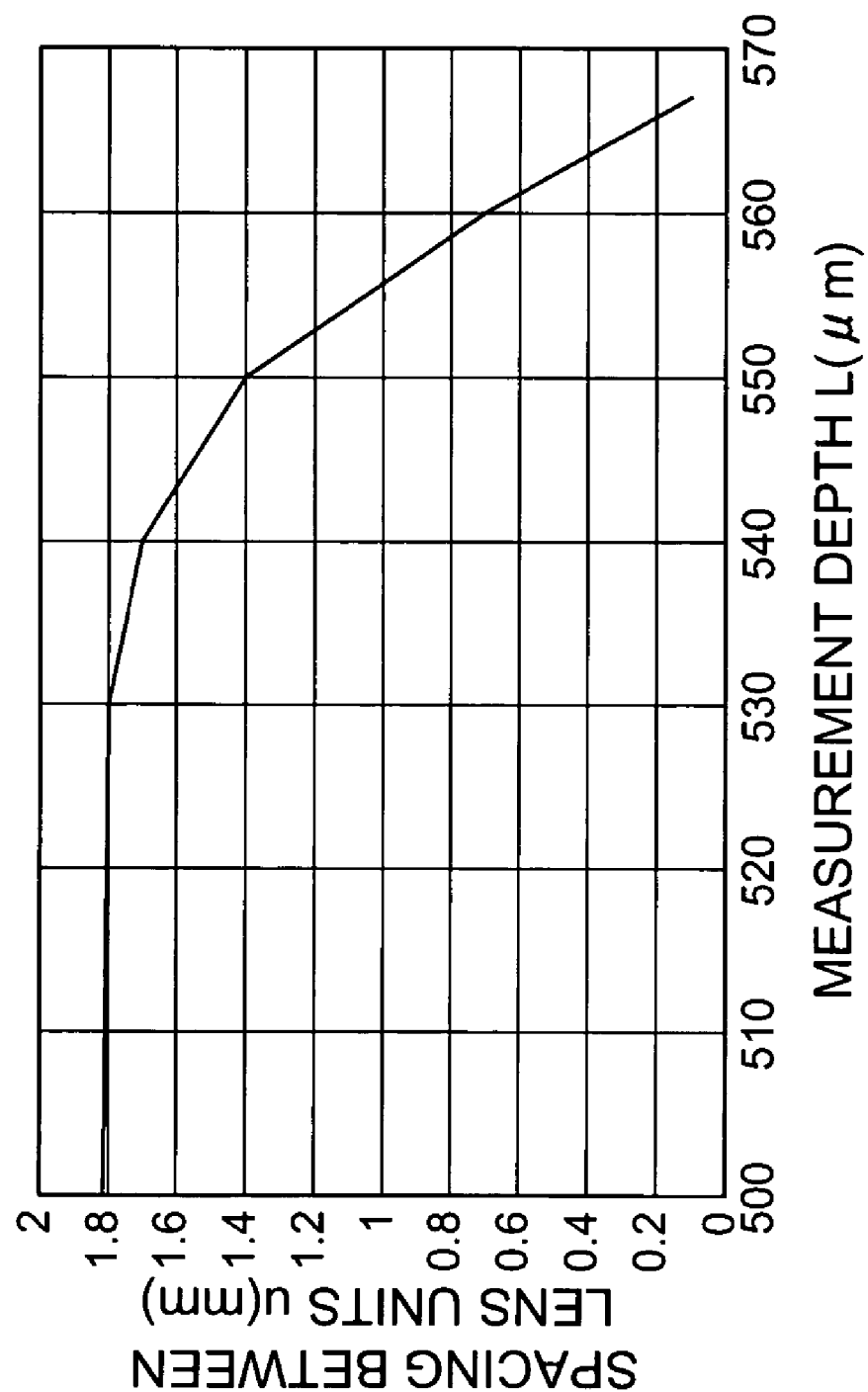
FIG. 12 is a graph showing another example of correlation between depth of measurement and spacing between lens units in the objective lens.

FIG. 12 is a graph showing another example of correlation between measurement depth and spacing between lens units in the objective lens. This graph shows a corrected state where the optical parameter of the substrate is $n_0$=3.5, the optical parameters of SIL 3 are $n_1$=3.5 and $R_1$=0.5 mm, and attained NA is 2.5. In this case, since the substrate and SIL 3 have the same refractive index, the spacing u between lens units is not dependent upon the thickness $d_1$ of SIL 3, but the thickness $t_0$ of the substrate and the thickness $d_1$ of SIL 3 vary in arbitrary combination with the measurement depth L. The spacing u between lens units for aberration correction is calculated by these correlations as shown in FIGS. 11 and 12.

The semiconductor inspection apparatus and inspection method according to the present invention will be further described below.

Figure 13:
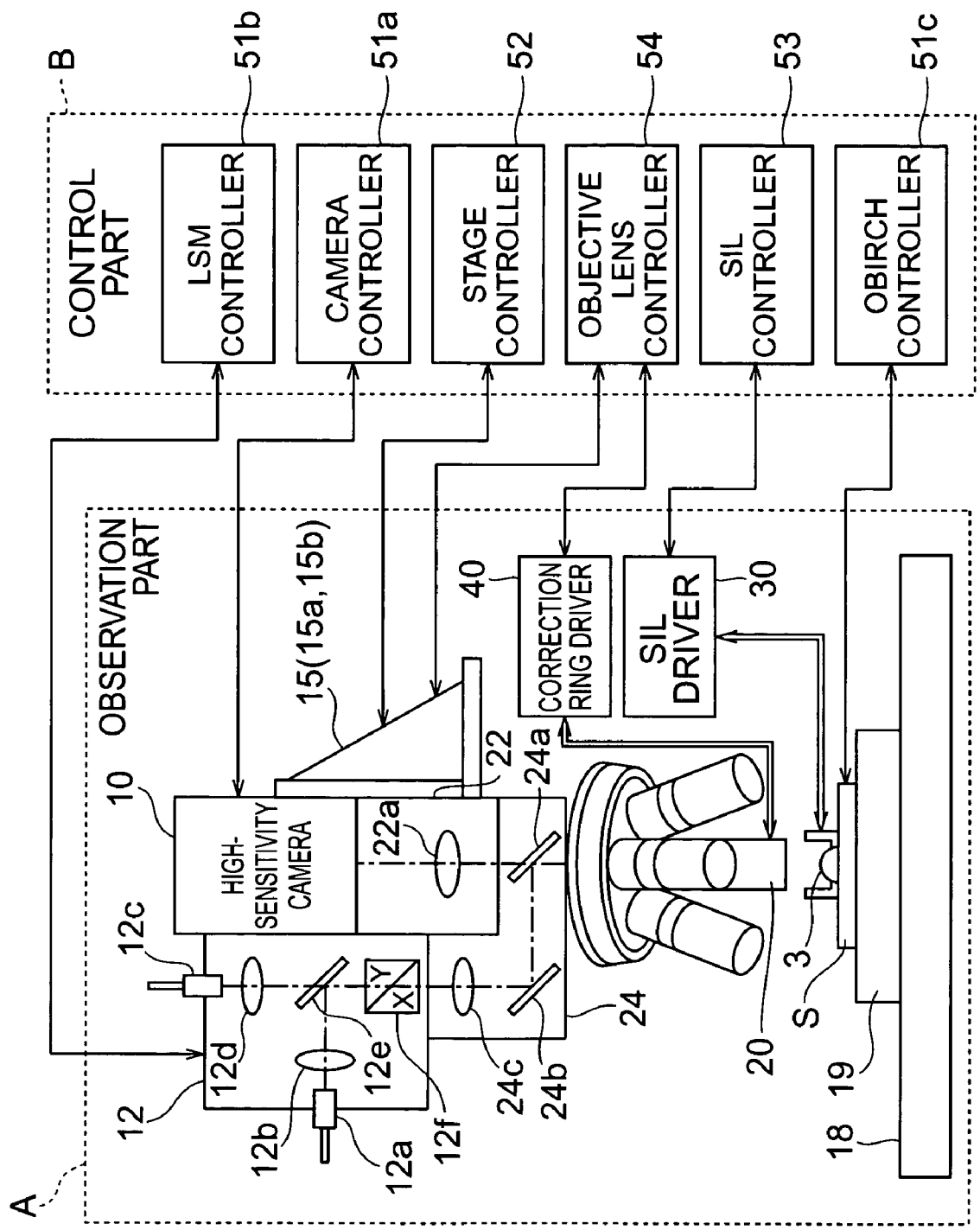
FIG. 13 is a configuration diagram showing another embodiment of the semiconductor inspection apparatus.
Figure 14:
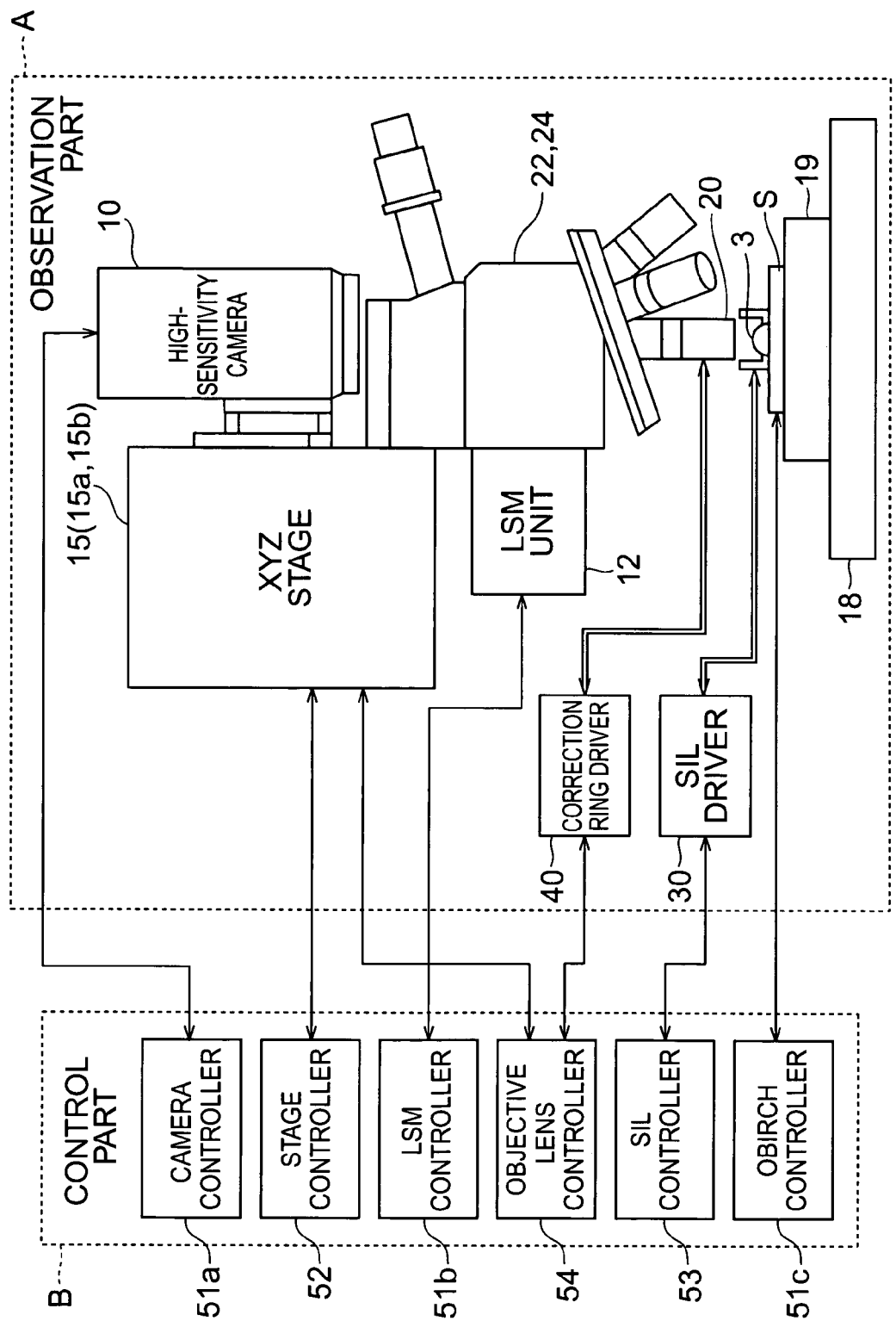
FIG. 14 is a configuration diagram showing a side view of the semiconductor inspection apparatus shown in FIG. 13.

FIG. 13 is a configuration diagram showing another embodiment of the semiconductor inspection apparatus according to the present invention. FIG. 14 is a configuration diagram showing a side view of the semiconductor inspection apparatus shown in FIG. 13. The present embodiment is an example showing a specific configuration of the semiconductor inspection apparatus shown in FIG. 1.

The semiconductor inspection apparatus in the present embodiment is provided with an observation part A, a control part B, and an analysis part C. Here the analysis part C is omitted from the illustration. A semiconductor device S as an inspected object is mounted on a stage 18 provided in the observation part A. Furthermore, in the present embodiment, the apparatus is equipped with a test fixture 19 for applying an electric signal necessary for inspection or the like to the semiconductor device S. The semiconductor device S is placed with its back side facing the objective lens 20.

The observation part A has a high-sensitivity camera 10 set in a black box (not shown), a laser scan optic (LSM: Laser Scanning Microscope) unit 12, optical systems 22, 24, an XYZ stage 15, an SIL 3, an SIL driver 30, and a correction ring driver 40.

Among these components, the camera 10 and LSM unit 12 correspond to the image acquisition part 1 in the configuration shown in FIG. 1. The optical systems 22, 24 correspond to the optical system 2. An objective lens 20 is located on the semiconductor device S side of the optical systems 22, 24. In the present embodiment, as shown in FIGS. 13 and 14, a plurality of objective lenses 20 having their respective magnifications different from each other are arranged to be switchable from one to another. An objective lens 20 is provided with two lens units 20a, 20b and a correction ring 21 as shown in FIG. 2 and is configured to be able to correct aberration by the correction ring driver 40. The test fixture 19 corresponds to the inspection part 16. The LSM unit 12 also has the function of the inspection part 16 in addition to the function of the image acquisition part 1.

The optical system 22 is a camera optical system for guiding light from the semiconductor device S incident through the objective lens 20, to the camera 10. The camera optical system 22 has an imaging lens 22a for focusing an image magnified at a predetermined magnification by an objective lens 20, on a light receiving surface inside the camera 10. A beam splitter 24a of the optical system 24 is interposed between objective lens 20 and imaging lens 22a. The high-sensitivity camera 10 can be, for example, a cooled CCD camera or the like.

In this configuration, the light from the semiconductor device S is guided through the optical system including the objective lens 20 and the camera optical system 22 to the camera 10. Then the camera 10 picks up an image such as a pattern image of the semiconductor device S. In another configuration, the camera can also picks up an emission image of the semiconductor device S. In this case, light emitted from the semiconductor device S in a voltage applied state by the test fixture 19 is guided through the optical system to the camera 10. Then the camera 10 picks up the emission image of the semiconductor device S to be used as an abnormality observation image. Specific examples of the emission from the semiconductor device S include one due to an abnormal portion based on a defect of the semiconductor device, transient emission with switching operation of a transistor in the semiconductor device, and so on. Furthermore, the acquired image may be an exothermic image based on a defect of device.

The LSM unit 12 has a laser beam introduction optical fiber 12a for irradiating an infrared laser beam, a collimator lens 12b for collimating the laser beam irradiated from the optical fiber 12a, into a parallel beam, a beam splitter 12e for reflecting the laser beam collimated into the parallel beam by the lens 12b, to change the optical path, and an XY scanner 12f for moving the laser beam reflected by the beam splitter 12e, in the XY directions to emit the laser beam toward the semiconductor device S.

The LSM unit 12 also has a condenser lens 12d for condensing light having been injected through the XY scanner 12f from the semiconductor device S side and having passed through the beam splitter 12e, and a detection optical fiber 12c for detecting the light condensed by the condenser lens 12d.

The optical system 24 is an LSM unit optical system for guiding light between the semiconductor device S and objective lens 20 and, the XY scanner 12f of the LSM unit 12. The LSM unit optical system 24 has a beam splitter 24a for reflecting part of light having been injected from the semiconductor device S through the objective lens 20, a mirror 24b for changing the optical path of the light reflected by the beam splitter 24a, to the optical path toward the LSM unit 12, and a lens 24c for condensing the light reflected by the mirror 24b.

In this configuration, the infrared laser beam emitted from a laser light source (not shown) and guided through the laser beam introduction optical fiber 12a travels via the lens 12b, beam splitter 12e, XY scanner 12f, optical system 24, and objective lens 20 onto the semiconductor device S and then enters the interior of the semiconductor device S.

Reflectively scattered light from the semiconductor device S with incidence of the incident light reflects a circuit pattern provided in the device surface of the semiconductor device S. The reflected light from the semiconductor device S travels through the optical path opposite to the incident light to reach the beam splitter 12e, and then passes through the beam splitter 12e. The light through the beam splitter 12e then travels through the lens 12d to enter the detection optical fiber 12c, and is detected by a photodetector coupled to the detection optical fiber 12c.

The intensity of the light detected through the detection optical fiber 12c by the photodetector is the intensity reflecting the circuit pattern provided in the semiconductor device S, as described above. Accordingly, while the infrared laser beam scans the semiconductor device S on the X-Y plane by the XY scanner 12f, a sharp image of the circuit pattern of the semiconductor device S or the like can be picked up.

The observation part A is further provided with the SIL 3. The SIL 3 is arranged movable between the aforementioned insertion position and standby position, relative to the high-sensitivity camera 10, LSM unit 12, optical systems 22, 24, and objective lens 20 and relative to the semiconductor device S mounted on the stage 18. The SIL driver 30 is provided for the SIL 3. The SIL driver 30 is comprised of an SIL moving device (SIL manipulator) to which an SIL holder for supporting the SIL 3 is coupled, and is an XYZ driving mechanism for moving the SIL 3 in the X, Y, and Z directions.

The control part B and analysis part C are provided for the observation part A for carrying out the observation and others for inspection of the semiconductor device S. In FIGS. 13 and 14, the analysis part C is omitted from the illustration.

The control part B has a camera controller 51a, an LSM controller 51b, an OBIRCH controller 51c, a stage controller 52, an SIL controller 53, and an objective lens controller 54. Among these, the stage controller 52, SIL controller 53, and objective lens controller 54 are as those described with FIG. 1, including the controls of focusing and aberration correction in the two control modes. The camera controller 51a, LSM controller 51b, and OBIRCH controller 51c correspond to the observation controller 51 in the configuration shown in FIG. 1.

The camera controller 51a and the LSM controller 51b control the operations of the high-sensitivity camera 10 and the LSM unit 12, respectively, thereby controlling the acquisition of an image of semiconductor device S carried out in the observation part A. The OBIRCH controller 51c is provided for acquiring an OBIRCH (Optical Beam Induced Resistance Change) image used in inspection of the semiconductor device S, and extracts a current change in the semiconductor device S appearing during a scan with the laser beam.

The analysis part C, as shown in FIG. 1, has an image analyzer 61 and an instructor 62, and is constructed, for example, of a computer or the like. Image information from the camera controller 51a and from the LSM controller 51b is entered through an image capture board provided in the computer of analysis part C.

A semiconductor inspection method with the semiconductor inspection apparatus shown in FIGS. 13 and 14 will be schematically described (cf. FIGS. 4 and 5). First, an observation of the semiconductor device S is carried out under the observation conditions after completion of the focusing and aberration correction in the first correction condition, in the normal mode in which the SIL 3 is located at the standby position (S200). Specifically, the semiconductor device S is scanned by the LSM unit 12 to acquire a pattern image thereof. An abnormality observation image used in detection of an abnormal portion in the semiconductor device S is also acquired. Specific examples of this abnormality observation image include an OBIRCH image acquired by the OBIRCH controller 51c, an emission image acquired by the camera 10, and so on. These pattern image and abnormality observation image are superimposed on each other, are displayed on the display device 63, etc. as occasion may demand. The acquired images are used to check an abnormal portion in the semiconductor device S, an abnormal portion detected is set as an inspection position, and the XYZ stage 15 and others are set so that the inspection position is located at the center of the field.

Then an observation of the semiconductor device S is carried out under the observation conditions after completion of the focusing and aberration correction in the second correction condition, in the SIL mode in which the SIL 3 is located at the insertion position corresponding to the inspection position of the semiconductor device S (S300). At this step, an enlarged pattern image, and an image such as an OBIRCH image or an emission image are acquired through the SIL 3 placed on the semiconductor device S and through the objective lens 20 and others. Superposition of the images, display thereof on the display device 63, etc. are carried out as occasion may demand. In acquisition of an emission image, the stage and others are properly moved so as to match the amount of chromatic aberration caused by the SIL 3, and the magnification is adjusted by software to implement superposition of images.

Figure 15:
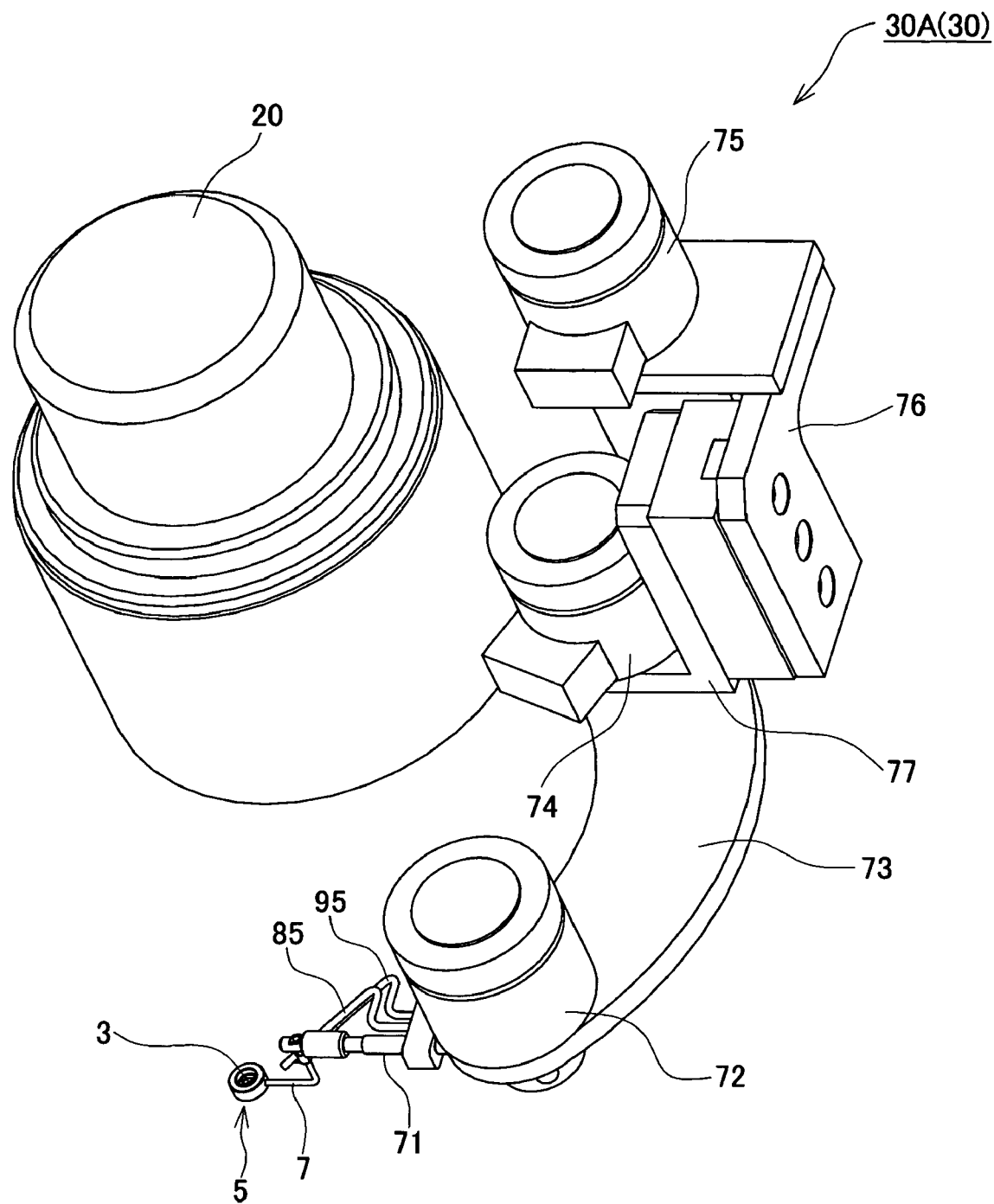
FIG. 15 is a perspective view from above an embodiment of an SIL manipulator and objective lens.

We will now explain a specific example of the solid immersion lens moving device (SIL moving device) used as the SIL driver 30 in the semiconductor inspection apparatus shown in FIGS. 13 and 14. FIG. 15 is a perspective view from above an SIL manipulator as an SIL moving device, and the objective lens.

The SIL 3 is supported by SIL holder 5. The SIL manipulator 30A (SIL driver 30) shown in FIG. 15 is an SIL moving device for driving the SIL 3 in the supported state by the SIL holder 5 in the three-dimensional directions to move the SIL 3 between the insertion position where the SIL 3 includes the optical axis to the objective lens 20 and is kept in close contact with the semiconductor device S, and the standby position off the optical axis. The SIL manipulator 30A in the present configuration example is further arranged to be also movable to a replacement position for replacement of the SIL 3 supported on the SIL holder 5.

Specifically, the SIL manipulator 30A has a first arm member 71 equipped with the SIL holder 5, a first arm member rotation source 72 for rotating the first arm member 71 in the X-Y plane (horizontal plane), a second arm member 73 for holding the first arm member rotation source 72, and a second arm member rotation source 74 for rotating the second arm member 73 in the X-Y plane. Furthermore, the SIL manipulator 30A has a Z-directional movement source 75 for moving the second arm member rotation source 74 in the Z direction perpendicular to the X-Y plane, this Z-directional movement source 75 is placed on the base end side, and the moving first arm member 71 is located on the terminal end side.

The Z-directional movement source 75 is comprised of a Z-axis motor or the like for moving a moving shaft in the Z direction, for example, by a feed screw or the like, and is mounted through a support portion 76 on the microscope part on the main body side of the inspection apparatus. This support portion 76 is detachably attached to the main body of the apparatus, for example, by screwing or the like, so as to achieve convenience in observation without the SIL manipulator 30A, in observation with another SIL moving device, and so on. The second arm member rotation source 74 is coupled through a support portion 77 to the moving shaft of the Z-directional movement source 75. This second arm member rotation source 74 is comprised, for example, of a motor with an output shaft being a rotational shaft to rotate in forward and backward directions (which can be arranged to rotate within a predetermined range), and is moved in the Z direction with driving of the Z-directional movement source 75.

One end of the second arm member 73 is coupled to the rotational shaft of the second arm member rotation source 74. This second arm member 73 is constructed in such curved shape that the second arm member 73 can readily recede from the field of the observation position of the semiconductor device S (the field of objective lens 20), as shown in FIG. 15. The first arm member rotation source 72 is fixed to the other end of this second arm member 73. This first arm member rotation source 72 is comprised, for example, of a motor with an output shaft being a rotational shaft to rotate in forward and backward directions (which can be arranged to rotate within a predetermined range).

As described above, the rotational shaft of the first arm member rotation source 72 is so located as not to be coaxial with the rotational shaft of the second arm member rotation source 74. With driving of the second arm member rotation source 74, the first arm member rotation source 72 is rotated together with the second arm member 73 in the X-Y plane and about a fulcrum at the rotational shaft of the second arm member rotation source 74. The other end of the aforementioned first arm member 71 is coupled to the rotational shaft of the first arm member rotation source 72. This first arm member 71 is rotated in the X-Y plane and about a fulcrum at the rotational shaft of the first arm member rotation source 72, with driving of the first arm member rotation source 72.

Figure 16:
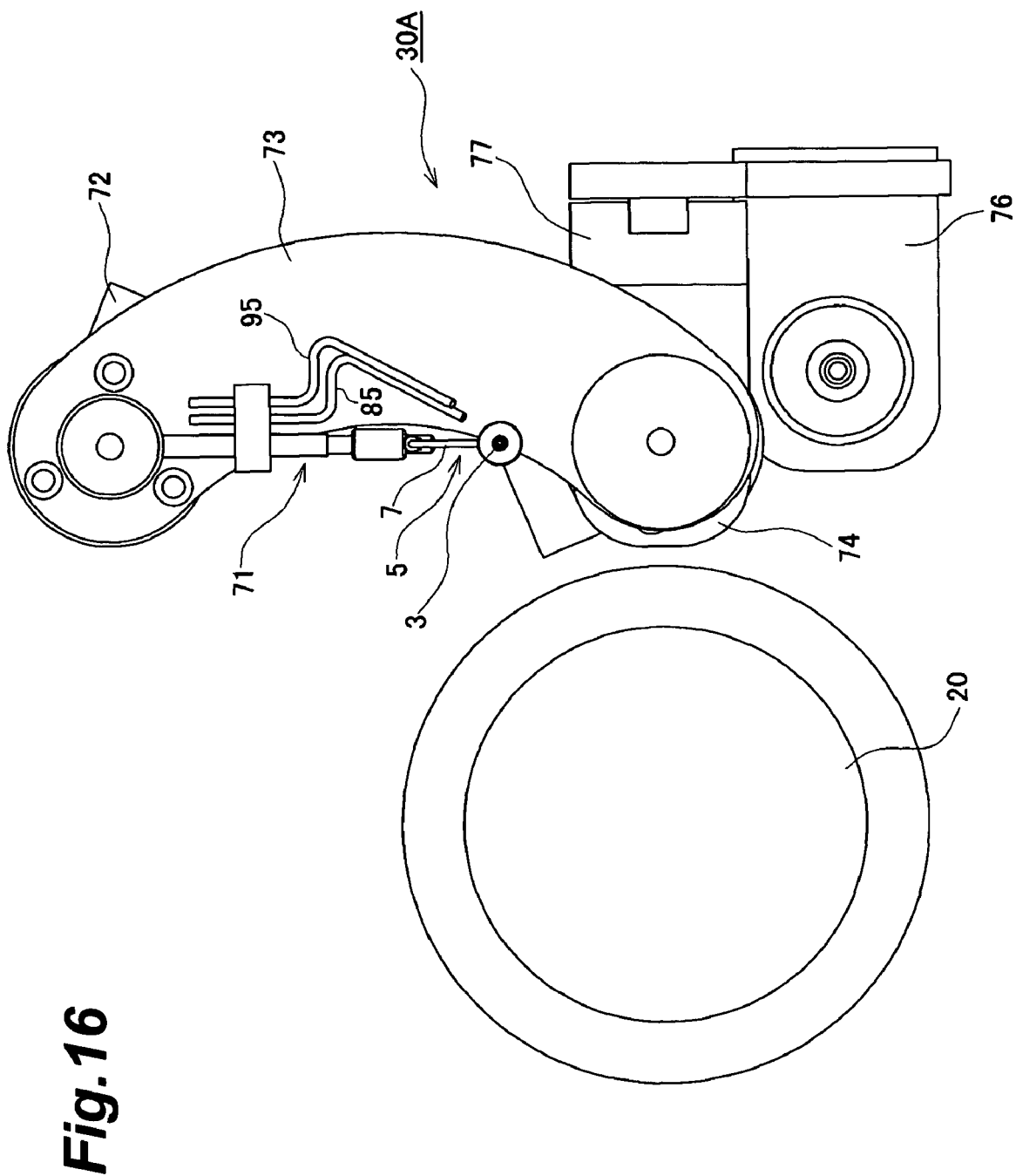
FIG. 16 is a bottom view showing the SIL manipulator and objective lens in a state in which the SIL is located at a standby position.
Figure 17:
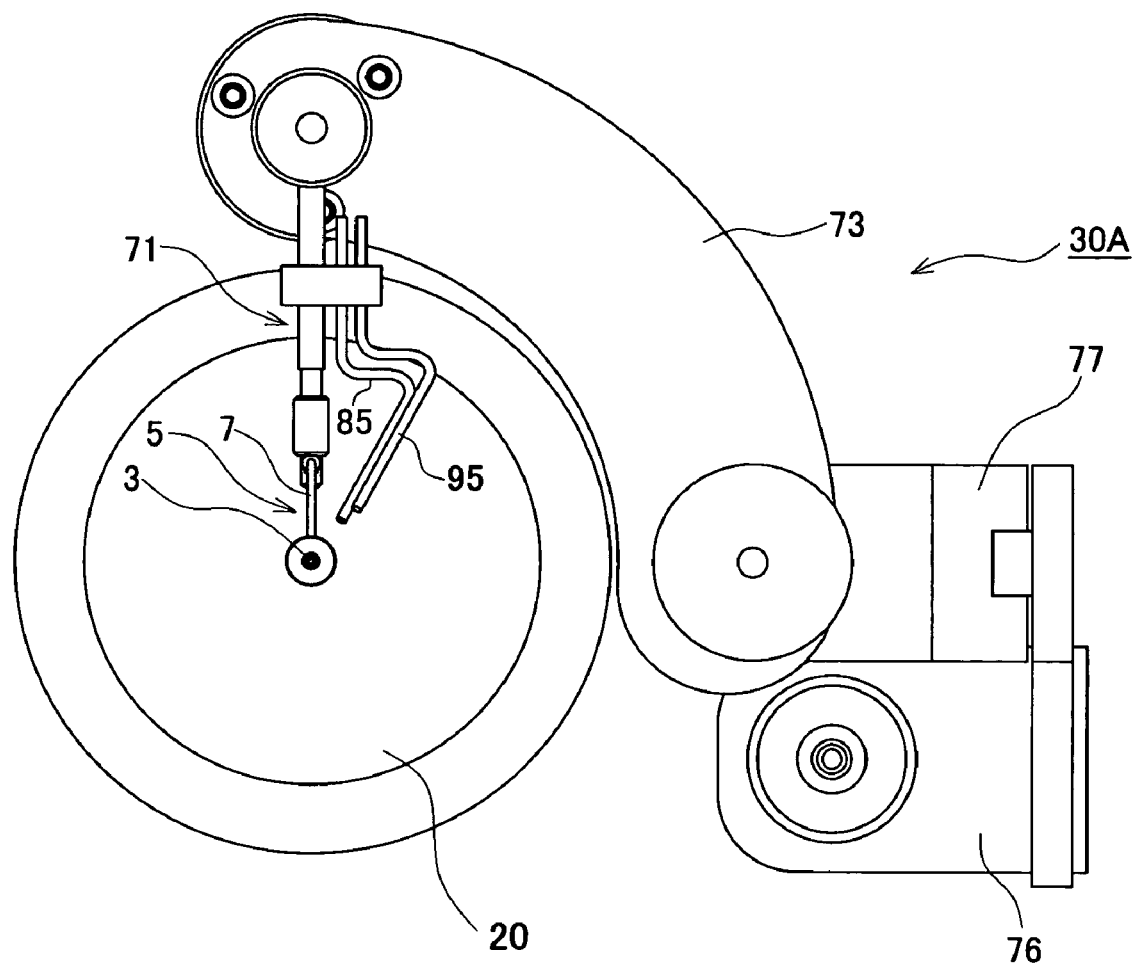
FIG. 17 is a bottom view showing the SIL manipulator and objective lens in a state in which the SIL is located at an insertion position.
Figure 18:
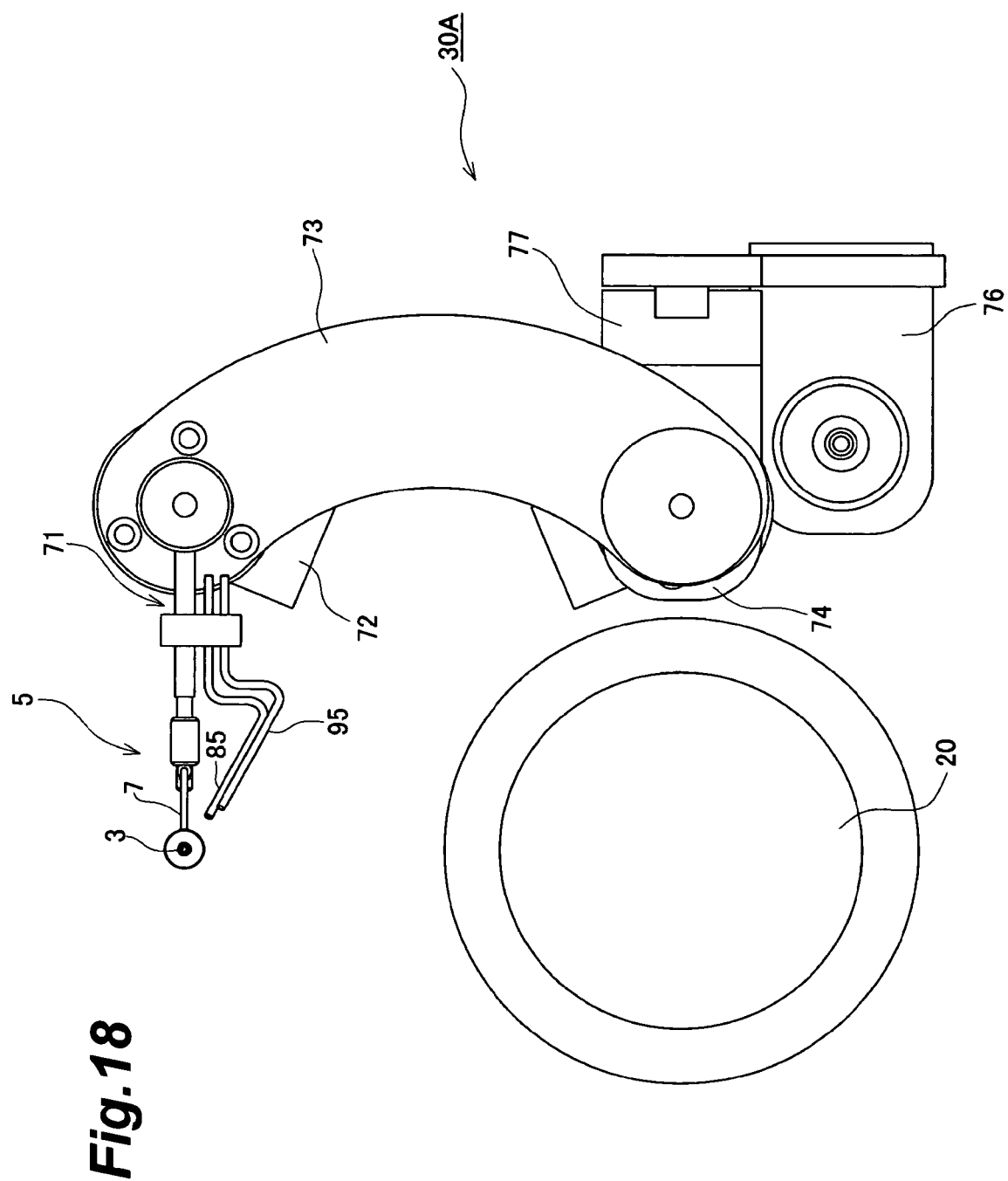
FIG. 18 is a bottom view showing the SIL manipulator and objective lens in a state in which the SIL is located at a replacement position.

In the above configuration, with driving of the first arm member rotation source 72 and the second arm member rotation source 74, the SIL 3 supported on the SIL holder 5 coupled to one end of the first arm member 71 is moved in a resultant direction of combination of their respective rotations in the X-Y plane. The SIL 3 is moved in the Z direction by driving of the Z-directional movement source 75. As a consequence, the SIL 3 is freely moved to any desired position in the three-dimensional directions. FIGS. 16 to 18 are bottom views each showing the SIL manipulator 30A and the objective lens 20, wherein FIG. 16 shows a state in which the SIL 3 is located at the standby position, FIG. 17 a state in which the SIL 3 is located at the insertion position, and FIG. 18 a state in which the SIL 3 is located at the replacement position.

The SIL manipulator 30A shown in FIG. 15 is provided with an optical coupling material supply pipe 85 for supplying an optical contact liquid to the SIL 3, and a gas supply pipe 95 for supplying a drying gas. These are used on the occasion of placing the SIL 3 at the insertion position and optically contacting the SIL 3 to the semiconductor device S.

Figure 19:
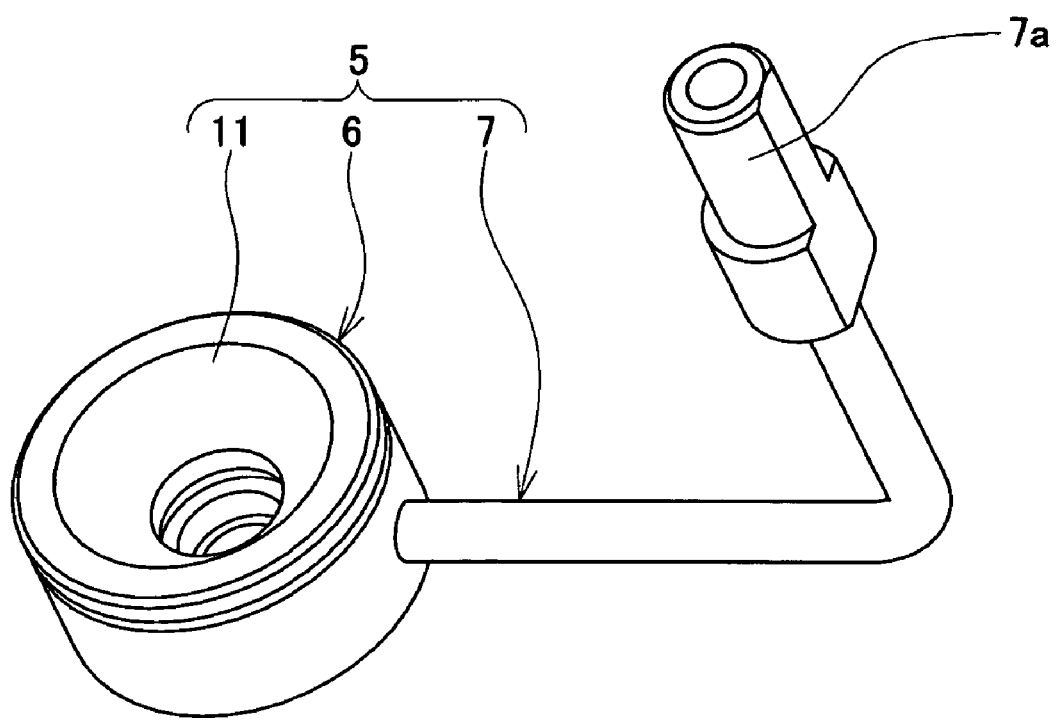
FIG. 19 is a perspective view showing a configuration of an SIL holder.
Figure 20A:
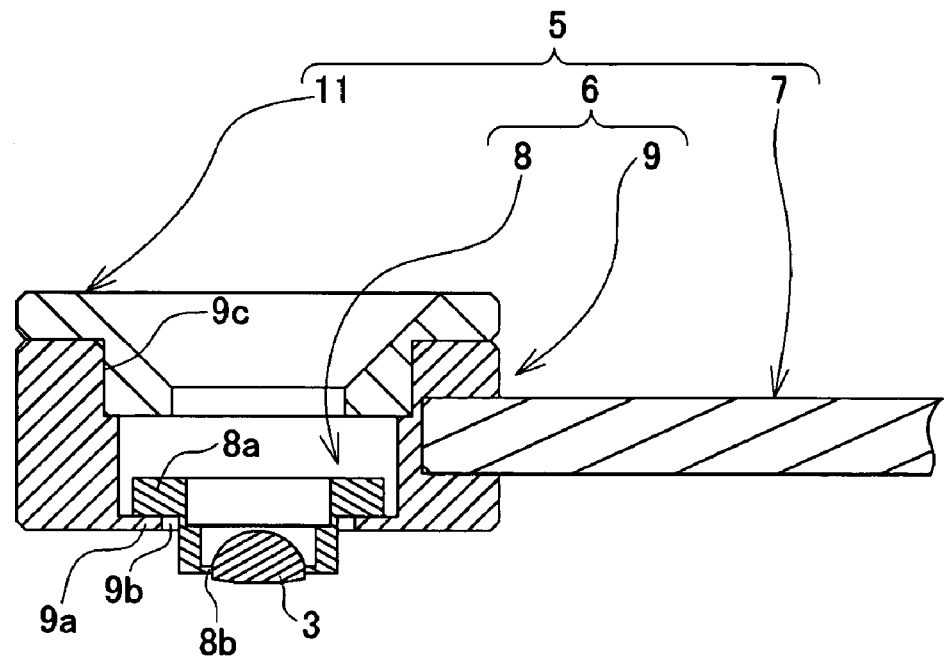
FIG. 20A and FIG. 20B are vertical sectional views showing (A) a state of the SIL holder at the standby position and (B) a state of the SIL holder at the insertion position, respectively.
Figure 20B:
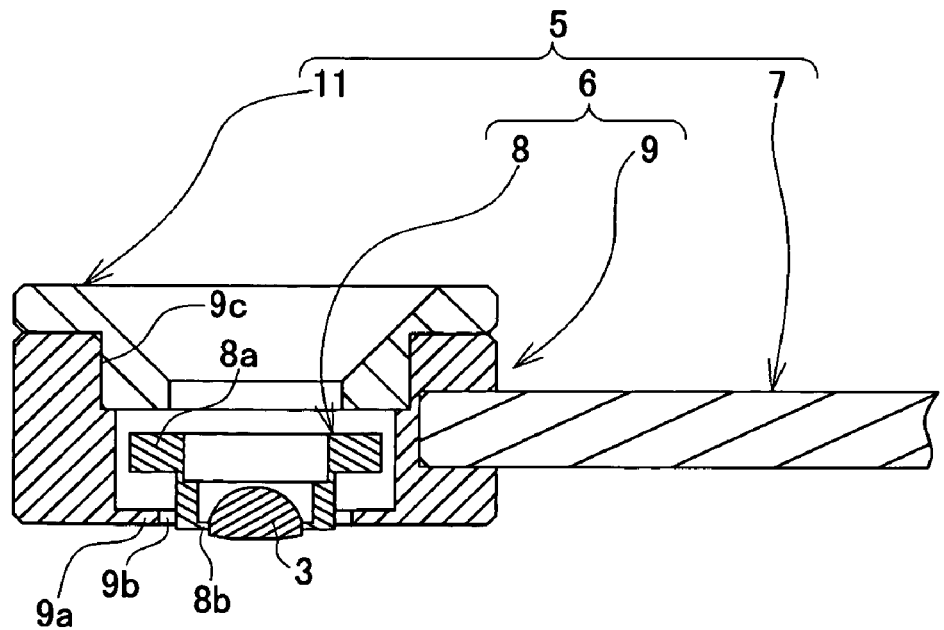

The SIL holder 5 for supporting the SIL 3 will be described. FIG. 19 is a perspective view showing a configuration of the SIL holder in the SIL manipulator shown in FIG. 15. FIGS. 20A and 20B are vertical sectional views showing (A) a state of the SIL holder at the standby position and (B) a state of the SIL holder at the insertion position, respectively.

The SIL holder 5, as shown in FIG. 19, is provided with a holder 6 of nearly cylindrical shape for supporting the SIL 3, and an arm 7 for holding this holder 6. Since this SIL holder 5 can get into touch with the optical contact liquid, it is made of a material highly resistant to corrosion, for example, one of metals such as stainless steel, aluminum, etc., or a resin easy to be molded according to the lens shape, for example, acrylic resin, PET, polyethylene, polycarbonate, and so on.

The holder 6, as shown in FIGS. 20A and 20B, is provided with a first holder 8 for holding the SIL 3, and a second holder 9 for supporting this first holder 8. These first holder 8 and second holder 9 are constructed in such nearly cylindrical shape as not to interfere with the optical path to the semiconductor device S.

The first holder 8 has an annular flange 8a projecting outward from the peripheral surface in the upper part thereof, and also has an annular flange 8b projecting inward in the bottom surface thereof. Then the SIL 3 is fixed and held on the first holder 8, for example, with an adhesive or the like in a state in which the bottom surface of the SIL 3 projects downward through an aperture formed in the inner circumference of the annular flange 8b. The second holder 9 has an annular flange 9a projecting inward in the bottom surface thereof. The annular flange 8a of the first holder 8 is mounted on the annular flange 9a of the second holder 9 in a state in which the bottom part of the first holder 8 projects downward through an aperture 9b formed in the inner circumference of the annular flange 9a, and the first holder 8 and SIL 3 are supported in the direction of weight on the second holder 9.

Since the dimensions are set in the relation of A<C<B herein where A represents the outside diameter of the lower part of the first holder 8, B the outside diameter of the annular flange 8a of the first holder 8, and C the inside diameter of the aperture 9b of the second holder 9, the first holder 8 is free relative to the second holder 9 and the first holder 8 is prevented from dropping off downward from the second holder 9.

The second holder 9 is provided with a cap 11 for retaining the SIL 3, which is mounted, for example, by fitting, meshing, or the like in an aperture 9c in the upper part thereof. This cap 11 is constructed in nearly cylindrical shape as the first holder 8 and the second holder 9 are, and dimensions are set in the relation of D<B where D represents the inside diameter of the cap 11. Accordingly, this cap 11 does not interfere with the optical path to the semiconductor device S, and prevents the first holder 8 holding the SIL 3 from dropping off, e.g., from jumping out through the aperture 9c in the upper part of the second holder 9, thereby preventing loss of the SIL.

The arm 7 is constructed by bending a round bar in nearly L-shape to extend outward from the second holder 9, one end thereof projects upward, and the other end is fixed to the side part of the second holder 9. At one end of this arm 7, an antirotation portion 7a, which contains a flat surface in part of a side face of a pipe, is fixed, for example, by fitting or the like so as to serve as a portion for preventing rotation of the arm 7 and holder 6. The arm 7 herein is constructed in nearly L-shape to extend upward at one end thereof, but it may also be constructed to extend within the X-Y plane. The arm 7 forming this SIL holder 5 is detachably coupled to one end of the first arm member 71 in the SIL manipulator 30A, as shown in FIG. 15.

In the SIL holder 5 and SIL manipulator 30A in the above configuration, the arm members 71, 73 are retracted in the state at the standby position shown in FIG. 16, so that the SIL 3 and arm members 71, 73 are outside the field of the objective lens 20. At this time, the first holder 8 holding the SIL 3 is in a state in which the annular flange 8a thereof is mounted on the annular flange 9a of the second holder 9 and in which the first holder 8 and SIL 3 are supported in the direction of weight on the second holder 9, as shown in FIG. 20A.

When the SIL 3 is moved from this standby position to the insertion position, the arm members 71, 73 are first rotated to move the SIL 3 at the standby position to the position including the optical axis between the semiconductor device S and the objective lens 20, as shown in FIG. 17. At this time, since the second arm member 73 is constructed in curved shape, the second arm member 73 is readily located away from the field, without interfering with the field of the objective lens 20.

After the SIL 3 is brought into the field in this way, the Z-directional movement source 75 of the SIL manipulator 30A is driven to lower the SIL 3. When the SIL 3 is located near the observation position, the optical contact liquid is supplied through the optical coupling material supply pipe 85 and the SIL 3 is mounted on the observation position to be placed at the contact position (insertion position). When the SIL 3 is mounted at the insertion position on the semiconductor device S, the SIL 3 and first holder 8 supported in the direction of weight by the second holder 9 go into a lifted state by the semiconductor device S, as shown in FIG. 20B. Furthermore, fine adjustment or the like for the position of the SIL 3 or the like is carried out in this state. An optical coupling material to be suitably used on this occasion can be an index matching fluid such as an index matching oil, or an optical contact liquid containing amphipathic molecules.

Since the SIL 3 and first holder 8 are free relative to the second holder 9 in the lifted state by the semiconductor device S, only the weight of the SIL 3 and first holder 8 acts at the observation position of the semiconductor device S. This prevents an excessive pressure from being applied to the semiconductor device, and the SIL 3 closely fits the semiconductor device at the observation position. Furthermore, the gas is supplied through the gas supply pipe 95 to dry the optical contact liquid, whereby the SIL 3 can be quickly and surely adhered to the semiconductor device S at the observation position.

For replacing the SIL 3 with another, the first arm member rotation source 72 of the SIL manipulator 30A is driven to rotate the first arm member 71, thereby moving the SIL 3 from the standby position to the replacement position shown in FIG. 18 and largely projecting the coupling part from near the position below the second arm member 73 to the outside. Then the SIL holder 5 with the arm 7 is replaced with another. This facilitates attachment and detachment of the arm 7 of the SIL holder 5 to and from the first arm member 71, and allows the SIL holder 5 together with the arm 7 to be replaced with another, whereby the lens replacement can be readily carried out without need for directly handling the small SIL 3.

The microscopes and sample observation methods according to the present invention are not limited to the above-described embodiments and configuration examples, but can be modified in various ways. For example, as to the specific configurations of the image acquisition part 1, optical system 2, inspection part 16, etc. in the above-stated semiconductor inspection apparatus and as to the specific inspection methods and others for inspection of the semiconductor device S, FIG. 13 and FIG. 14 show just an example of the configurations, but it is also possible to adopt a variety of configurations and inspection methods except for those. Where only the observation is carried out for various devices such as semiconductor devices, the apparatus may be constructed as a device observation apparatus without the inspection part 16. The image acquisition part 1 may also be excluded if not necessary, e.g., where the operator directly observes the image. The SIL driver 30 for driving the SIL 3 can also be implemented by a variety of mechanisms other than the SIL manipulator 30A shown in FIG. 15. It is also noted that the use of the above optical coupling material for achieving the optical contact between the SIL and the substrate is just an example, and another applicable method is to press the SIL against the substrate to achieve evanescent coupling.

The above embodiments described the semiconductor inspection apparatus and semiconductor inspection methods for the semiconductor device as an observed object, but the present invention can also be applied to cases where an observed object except for the semiconductor devices is used as a sample, as a microscope and a sample observation method used for observation of the sample at the predetermined observation plane and through the sample. This permits us to readily carry out the observation of the microstructure of the sample or the like in the observation of the sample. Specific examples of the sample in this case include, for example, various devices such as the aforementioned semiconductor devices and liquid crystal devices, or bio-related samples using a slide or the like.

The entry of the optical parameters of SIL for the correction tables can be implemented by individually entering values of parameters, or by any other method, for example, by a configuration of preparing a set of parameters corresponding to each model number of SIL, by a configuration of providing each SIL with a storage medium such as an IC chip storing values of parameters, and retrieving the data at a time of use, and so on, as described above.

For example, the entry of the optical parameters of SIL can be implemented by a configuration of providing the SIL, SIL holder, or arm with a storage medium of a semiconductor device, magnetic device, or the like, storing values of parameters such as a model number, serial number, curvature radius, thickness, and refractive index. Specific examples of the method for retrieving the parameter data in this configuration include a method of receiving the data by radio wave, a method of receiving the data via electric contact through the arm and SIL manipulator, and the like. Alternatively, a configuration of providing the SIL holder with a bar code, and reading the parameter data by image recognition of the bar code can be used.

In addition, a configuration of providing the SIL holder with a mark for recognizing the individual SIL with the naked eye or by using the image can be used. Specific examples of the method for retrieving the parameter data by using the above-mentioned mark include a method of reading the data by using a number or color of lines, points, color of the holder itself, serial number, or the like. In this case, it is possible to use a method of recognizing ID of the SIL by the mark, specifying the serial number, and retrieving the parameter data such as a curvature radius, thickness, and refractive index registered in the software. The above parameter data corresponding to the SIL serial number can be provided by a flexible disk or the like, and registered beforehand in the software.

The microscope and sample observation method according to the present invention can be applied as a microscope and a sample observation method capable of readily observing a sample necessary for an analysis of microstructure of a semiconductor device. Namely, the present invention provides the microscope and sample observation method capable of readily performing the observation of microstructure of a sample or the like, by carrying out the observation of the sample at the predetermined observation plane and through the sample, while switching between the first mode of carrying out the observation in consideration of the optical parameters of the sample with the solid immersion lens at the standby position and the second mode of carrying out the observation in consideration of the optical parameters of the sample and solid immersion lens with the solid immersion lens at the insertion position.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A sample observation method of observing a sample at a predetermined observation plane and through an optical system comprising an objective lens, the sample observation method comprising:

a normal image observation step of observing a normal image of the sample in a state of placing a solid immersion lens at a standby position off an optical axis from the sample to the optical system;

a correction step of placing the solid immersion lens at an insertion position including the optical axis from the sample to the optical system and carrying out focusing and aberration correction under a correction condition set based on a refractive index $n_0$ of the sample and a thickness $t_0$ of the sample up to the observation plane, and a refractive index $n_1$, a thickness $d_1$, and a radius of curvature $R_1$ of the solid immersion lens; and an enlarged image observation step of observing an enlarged image of the sample in a state after completion of the focusing and aberration correction in the correction step.

2. The sample observation method according to claim 1, wherein in the correction step, the focusing is carried out by changing a distance between the sample and the objective lens.

3. The sample observation method according to claim 1, wherein in the correction step, the aberration correction is carried out by changing a spacing between a first lens unit and a second lens unit arranged along the optical axis in the objective lens.

4. The sample observation method according to claim 1, wherein the correction step is arranged to use a focusing table and an aberration correction table corresponding to the correction condition.

5. The sample observation method according to claim 1, comprising a normal correction step of placing the solid immersion lens at the standby position off the optical axis from the sample to the optical system and carrying out focusing by changing a distance between the sample and the objective lens.

6. The sample observation method according to claim 5, wherein in the normal correction step, an aberration correction is carried out under a normal correction condition set based on the refractive index $n_0$ of the sample and the thickness $t_0$ of the sample up to the observation plane.

7. The sample observation method according to claim 6, wherein the normal correction step is arranged to use an aberration correction table corresponding to the normal correction condition, and the correction step is arranged to use a focusing table and an aberration correction table corresponding to the correction condition.

8. The sample observation method according to claim 6, wherein in the normal correction step, the aberration correction is carried out by changing a spacing between a first lens unit and a second lens unit arranged along the optical axis in the objective lens.

9. The sample observation method according to claim 5, wherein in the normal correction step, the focusing is carried out under a normal correction condition set based on the refractive index $n_0$ of the sample and the thickness $t_0$ of the sample up to the observation plane.

10. The sample observation method according to claim 9, wherein the normal correction step is arranged to use a focusing table corresponding to the normal correction condition, and the correction step is arranged to use a focusing table and an aberration correction table corresponding to the correction condition.

11. The sample observation method according to claim 1, wherein the sample is a semiconductor device.

* * * * *